(12) United States Patent
Shimoji et al.

(10) Patent No.: US 6,572,275 B2
(45) Date of Patent: Jun. 3, 2003

(54) OPTICAL CONNECTOR

(75) Inventors: Naoko Shimoji, Tokyo (JP); Koji Seo, Tokyo (JP); Jun Yamakawa, Tokyo (JP); Shinichi Matsumoto, Tokyo (JP); Masato Shiino, Tokyo (JP); Renichi Yuguchi, Tokyo (JP); Hideki Miyazaki, Tokyo (JP)

(73) Assignee: The Furukawa Electric Co., Ltd., Tokyo (JP)

( * ) Notice: Subject to any disclaimer, the term of this patent is extended or adjusted under 35 U.S.C. 154(b) by 0 days.

(21) Appl. No.: 09/995,850

(22) Filed: Nov. 28, 2001

(65) Prior Publication Data

US 2002/0118926 A1 Aug. 29, 2002

(30) Foreign Application Priority Data

| Nov. 28, 2000 | (JP) | 2000-361375 |
|---|---|---|
| Dec. 28, 2000 | (JP) | 2000-402106 |
| Mar. 30, 2001 | (JP) | 2001-100479 |
| Apr. 26, 2001 | (JP) | 2001-129611 |
| May 31, 2001 | (JP) | 2001-165810 |
| May 17, 2001 | (JP) | 2001-147966 |

(51) Int. Cl.$^7$ .............. G02B 6/36; G02B 6/38
(52) U.S. Cl. .............. 385/76; 385/56; 439/352
(58) Field of Search .............. 385/56, 76, 72, 385/53; 439/352

(56) References Cited

U.S. PATENT DOCUMENTS

| 4,762,389 A | * | 8/1988 | Kaihara | 385/60 |
|---|---|---|---|---|
| 5,129,024 A | * | 7/1992 | Honma | 385/76 |
| 5,435,744 A | * | 7/1995 | Derstine et al. | 439/352 |
| 5,580,268 A | * | 12/1996 | Miyazawa | 439/352 |
| 6,095,695 A | * | 8/2000 | Ohtsuka et al. | 385/72 |
| 6,146,179 A | * | 11/2000 | Denny et al. | 439/352 |
| 6,435,728 B2 | * | 8/2002 | Shimoji et al. | 385/56 |

FOREIGN PATENT DOCUMENTS

JP  2000-199833  7/2000

* cited by examiner

Primary Examiner—Michael C. Zarroli
(74) Attorney, Agent, or Firm—Knobbe, Martens, Olson & Bear LLP

(57) ABSTRACT

An optical connector for making connection with a connecting partner side and releasing this connection is provided. The optical connector has an optical connector housing. The optical connector housing is formed by inserting a slider into a base end wall of an arm side member so as to be freely advanced and retreated. A cam following face is formed on an inner wall face of an arm portion of the arm side member. A claw portion is formed on a tip side of the arm portion. An opening angle driving cam member is connected to a tip side of the slider. A ferrule is arranged between the arm portions on a forward side of the opening angle driving cam member. When the slide is moved backward, the opening angle driving cam member is moved backward and is operated to angularly open the arm portion through the cam following face. This opening angle state is maintained by making the opening angle driving cam member abut on a stationary face of the cam following face. The claw portion is dislocated from an engaging position with the connecting partner side by the angular opening of the arm portion so that the connection of the optical connector is released.

28 Claims, 22 Drawing Sheets

Prior Art

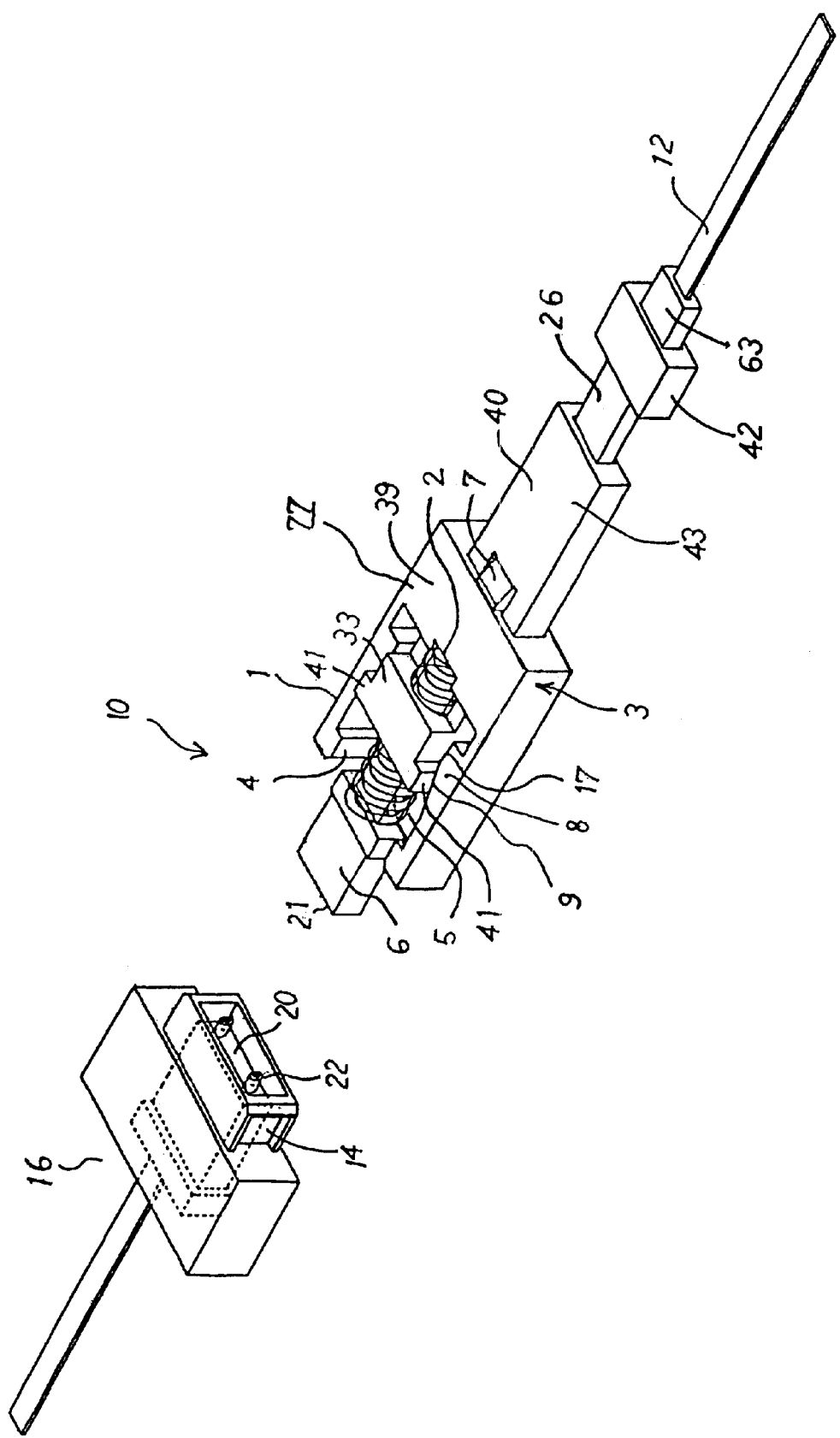

OPTICAL CONNECTOR

BACKGROUND OF THE INVENTION

Optical communication using an optical fiber is vigorously performed. As the optical communication is developed, high density mounting of the optical fiber is required. Further; it is considered that an optical connector used to connect the optical fiber is made compact and an optical module is mounted at high density, etc.

In comparison with a conventional SC type connector, an MU type connector is about one fourth in cross section and is compact. Further, an MT optical connector fixedly arranging a multicore optical fiber therein is recently widely used.

SUMMARY OF THE INVENTION

The present invention provides an optical connector housing for accommodating a ferrule of an optical connector in one aspect. This optical connector housing comprises:

- arm portions respectively extending forward from both end sides of a base end wall;
- an opening angle driving cam member arranged between the arm portions; and
- a slider for advancing and retreating said opening angle driving cam member in an extending direction of said arm portion;
- wherein an engaging portion engaged with a connecting partner side is formed on each of tip sides of both said arm portions;
- a tip portion of the arm portion on at least one side has an arm extending portion extended and formed forward from said engaging portion;
- a cam following face moved by the retreating movement of said opening angle driving cam member and angularly opening the arm portion is formed in each of inner walls of both said arm portions; and
- the engagement of the engaging portion on the tip side of said arm portion with the connecting partner is released by the angular opening of said arm portion.

The invention provides an optical connector housing for accommodating a ferrule of an optical connector in another aspect. This optical connector housing comprises:

- arm portions respectively extending forward from both end sides of a base end wall;
- an opening angle driving cam member arranged between the arm portions; and
- a slider for advancing and retreating said opening angle driving cam member in an extending direction of said arm portion;
- wherein an engaging portion engaged with a connecting partner side is formed on each of tip sides of both said arm portions;
- a cam following face moved by the retreating movement of said opening angle driving cam member and angularly opening the arm portion is formed in each of inner walls of both said arm portions;
- said cam following face has a taper-shaped face rising on a rear side, and a stationary face having no inclination and flatly extending backward from a terminal end of this taper-shaped face; and
- the opening angle of the arm portion is held by abutting the opening angle driving cam member on the stationary face of said arm portion.

The invention also provides an optical connector. This optical connector comprises:

- an optical connector housing; and
- a ferrule accommodated to said optical connector housing and connected and fixed to the tip side of an optical fiber;
- said optical connector housing having:
  - arm portions respectively extending forward from both end sides of a base end wall;
  - an opening angle driving cam member arranged between the arm portions; and
  - a slider for advancing and retreating said opening angle driving cam member in an extending direction of said arm portion;
  - wherein said opening angle driving cam member is arranged on a rear side of said ferrule;
  - an engaging portion engaged with a connecting partner side is formed on each of tip sides of both said arm portions;
  - a cam following face moved by the retreating movement of said opening angle driving cam member and angularly opening the arm portion is formed in each of inner walls of both said arm portions;
  - said optical fiber is an optical fiber of an optical fiber cord;
  - the outer circumference of an optical fiber core exposed by removing an outer cover of said optical fiber cord is covered with a sleeve-shaped member; and
  - an end portion of the outer cover of the optical fiber cord member is fixed to an outer circumferential portion of said sleeve-shaped member, and said sleeve-shaped member is freely moved relatively with respect to the optical fiber core along a longitudinal direction of the optical fiber core.

The invention further provides another optical connector. This optical connector comprises:

- an optical connector housing; and
- a ferrule accommodated to said optical connector housing and connected and fixed to the tip side of an optical fiber;
- said optical connector housing having:
  - arm portions respectively extending forward from both end sides of a base end wall;
  - an opening angle driving cam member arranged between the arm portions; and
  - a slider for advancing and retreating said opening angle driving cam member in an extending direction of said arm portion;
  - wherein said opening angle driving cam member is arranged on a rear side of said ferrule;
  - an engaging portion engaged with a connecting partner side is formed on each of tip sides of both said arm portions;
  - a cam following face moved by the retreating movement of said opening angle driving cam member and angularly opening the arm portion is formed in each of inner walls of both said arm portions;
  - said optical fiber is an optical fiber of an optical fiber cord;
  - an optical fiber core of the optical fiber cord exposed by removing an outer cover is pulled out of a rear end of said ferrule;
  - an outer circumference of the optical fiber core exposed by removing said outer cover is covered with a sleeve-shaped member;
  - a tensile strength fiber of the optical fiber cord exposed together with said optical fiber core by removing the outer cover is arranged in an outer circumferential portion of said sleeve-shaped member;

a member for fixation is fitted to the outer circumferential portion of said sleeve-shaped member arranging this tensile strength fiber therein by putting said tensile strength fiber therebetween;

irregularities are formed in at least one of an inner wall face of this member for fixation and an outer circumferential face portion of the sleeve-shaped member opposed to this inner wall face; and the sleeve-shaped member and the member for fixation nip and fix said tensile strength fiber by utilizing a convex portion of said irregularities.

The invention further provides an optical connector connecting structure for connecting an optical connector to a connecting object and releasing this connection. The optical connector of this optical connector connecting structure comprises:

a ferrule for accommodating and fixing the tip side of an optical fiber; and an optical connector housing for accommodating this ferrule;

wherein said optical connector housing has a slider freely advanced and retreated;

said optical connector housing has arm portions respectively extending forward from both end sides of a base end wall, and an engaging portion engaged with said connecting object is formed on each of tip sides of both the arm portions;

a tip side of said slider is located between said arm portions, and an opening angle driving cam member is arranged on this tip side of the slider;

a cam following face moved by the retreating movement of said opening angle driving cam member and angularly opening the arm portion is formed in each of inner walls of both the arm portions of said optical connector housing;

an engagement receiving portion engaged with said engaging portion of each of both the arm portions of said optical connector housing is arranged in said connecting object;

a guide mechanism for guiding attaching and detaching movements of the optical connector with respect to the connecting object is arranged in said slider and a connecting object side;

when the slider is slid to the connecting object side in accordance with said guide mechanism, the optical connector housing is pressed against the slider and said engaging portion is automatically engaged with said engagement receiving portion; and when the slider is slid in an opposite direction in accordance with the guide mechanism, said cam following face is moved by the movement of said opening angle driving cam member so that said arm portion is angularly opened and said engaging portion is disengaged from said engagement receiving portion.

The invention further provides another optical connector connecting structure. The optical connector of this optical connector connecting structure comprises:

a ferrule for accommodating and fixing the tip side of an optical fiber;

an optical connector housing for accommodating this ferrule; and an external housing for covering the outside of said optical connector housing;

wherein said optical connector housing has a slider freely advanced and retreated;

said optical connector housing has arm portions respectively extending forward from both end sides of a base end wall, and an engaging portion engaged with said connecting object is formed on each of tip sides of both the arm portions;

a tip side of said slider is located between said arm portions, and an opening angle driving cam member is arranged on this tip side of the slider;

a cam following face moved by the retreating movement of said opening angle driving cam member and angularly opening the arm portion is formed in each of inner walls of both the arm portions of said optical connector housing;

an insert portion projected forward is formed on a tip side of said external housing; and an insert receiving portion inserting said insert portion of said external housing thereinto is arranged on said connecting object side connected to said optical connector.

BRIEF DESCRIPTION OF THE DRAWINGS

Exemplary embodiments of the invention will now be described in conjunction with drawings in which:

FIG. 8 is a perspective constructional view showing an optical connector in a second embodiment of the invention and its connecting object (connecting partner).

DETAILED DESCRIPTION

Figure 7:
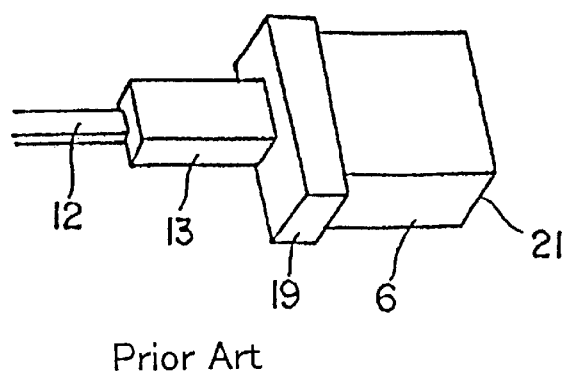
FIG. 7 is an explanatory view showing an MT optical connector.

As shown in FIG. 7, an MT optical connector recently used is formed by inserting and fixing an optical fiber ribbon 12 having plural optical fibers arranged side by side to a ferrule 6. In FIG. 7, reference numerals 13 and 19 respectively designate a boot for protecting the optical fiber ribbon 12, and a flange portion of the ferrule 6. Unillustrated plural optical fiber insertion holes are formed in the ferrule 6. The optical fibers of the optical fiber ribbon 12 are inserted into the optical fiber insertion holes, and each of tips of the optical fibers is exposed to a connecting end face 21 of the ferrule 6.

Figure 6:
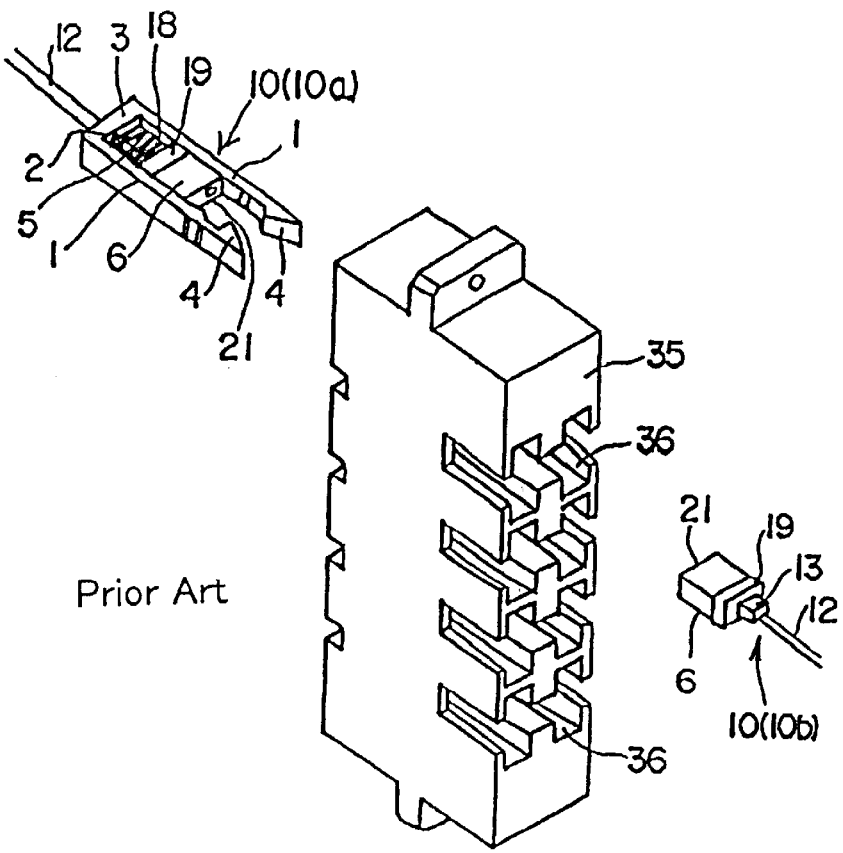
FIG. 6 is an explanatory view showing a prior proposal example of the connecting method of optical connectors using an optical connector housing.

As shown in FIG. 6, an adapter 35 having plural optical connector insertion holes 36 is used as a means for connecting such optical connectors to each other. The optical connectors 10 are bidirectionally inserted into the optical connector insertion holes 36 of this adapter 35 so that optical connectors 10a, 10b are connected to each other.

In this proposed method, an optical connector housing 3 is arranged in the optical connector 10 on one side (the left-hand side of FIG. 6) so that the optical connector 10 (10a) with the optical connector housing 3 is formed. This optical connector 10a and the optical connector 10b on the right-hand side in this figure having no optical connector housing 3 are connected to each other through the optical connector housing 3 within the optical connector insertion hole 36.

This proposed connecting method is shown in excerpt B-10-34 of Great Meeting of Electronic Information Communication Society of Japan in 1997. The optical connector housing 3 has arm portions 1 extending from both end sides of a face (base end face) 2 on a base end side of this optical connector housing 3. A space nipped by the arm portions 1 forms an accommodating space of the ferrule 6 of the optical connector 10. A claw portion 4 as an engaging portion is formed on a tip side of each arm portion 1, and the tip of the arm portion 1 has a latch structure of a wedge shape.

A spring 5 for biasing the ferrule 6 against the optical connector 10b on a connecting partner side is arranged in the optical connector 10a having this optical connector housing 3 between a rear end face 18 of the ferrule 6 and the face 2 of the optical connector housing 3 on its base end side. The tip of the arm portion 1 of the optical connector housing 3 is extended to a forward side from the connecting end face 21 of the ferrule 6. The optical connectors 10 are connected to each other by engaging the claw portion 4 at the tip of the arm portion 1 with a rear end side of the flange portion 19 of the optical connector 10b shown on the right-hand side of FIG. 6.

When the optical connectors 10 are connected to each other and this connection is released, a dedicated attaching-detaching jig is adapted to be used. For example, when the optical connectors 10 are connected to each other, the optical connectors 10 gripped by the jig are pressed into the optical connector housing 3 and are connected to each other. In contrast to this, when this connection is released, the claw portion 4 engaged with the flange portion 19 of the optical connector 10 (10b) on the right-hand side is disengaged therefrom by a wedge and both the optical connectors 10 are pulled and extracted.

When the optical connectors 10 are respectively inserted into the optical connector insertion holes 36 of the adapter 35 and are connected to each other, a connecting pair of the connected optical connectors 10 attains a state in which the optical connectors 10 are vertically overlapped and arranged in the adapter 35.

However, as mentioned above, the dedicated attaching-detaching jig is required to connect the optical connectors 10 and release this connection. Such an attaching-detaching jig is not easily used since the space between adjacent connectors is narrowed as high integration of the optical connectors is advanced. Further, when the optical connectors are attached and detached by using the attaching-detaching jig, attaching-detaching management (maintenance) of the optical connectors also becomes complicated.

Accordingly, when the optical connectors arranged at high density are detachably connected to each other and are detachably connected to optical modules mounted at high density on a substrate and the above connecting method of the optical connectors 10 is applied, its attaching-detaching work is not easily made. Further, the maintenance management of the optical connectors 10 also becomes complicated.

The present invention in one aspect provides an optical connector housing able to easily and accurately attach and detach optical connectors without requiring any dedicated attaching-detaching jig, etc., and an optical connector using this optical connector housing. Further, the invention in another aspect provides an optical connector connecting structure using an optical connector housing able to detachably and accurately connect an optical connector to an optical part such as an optical module, or a connecting partner such as an adapter at high density.

Figure 1:
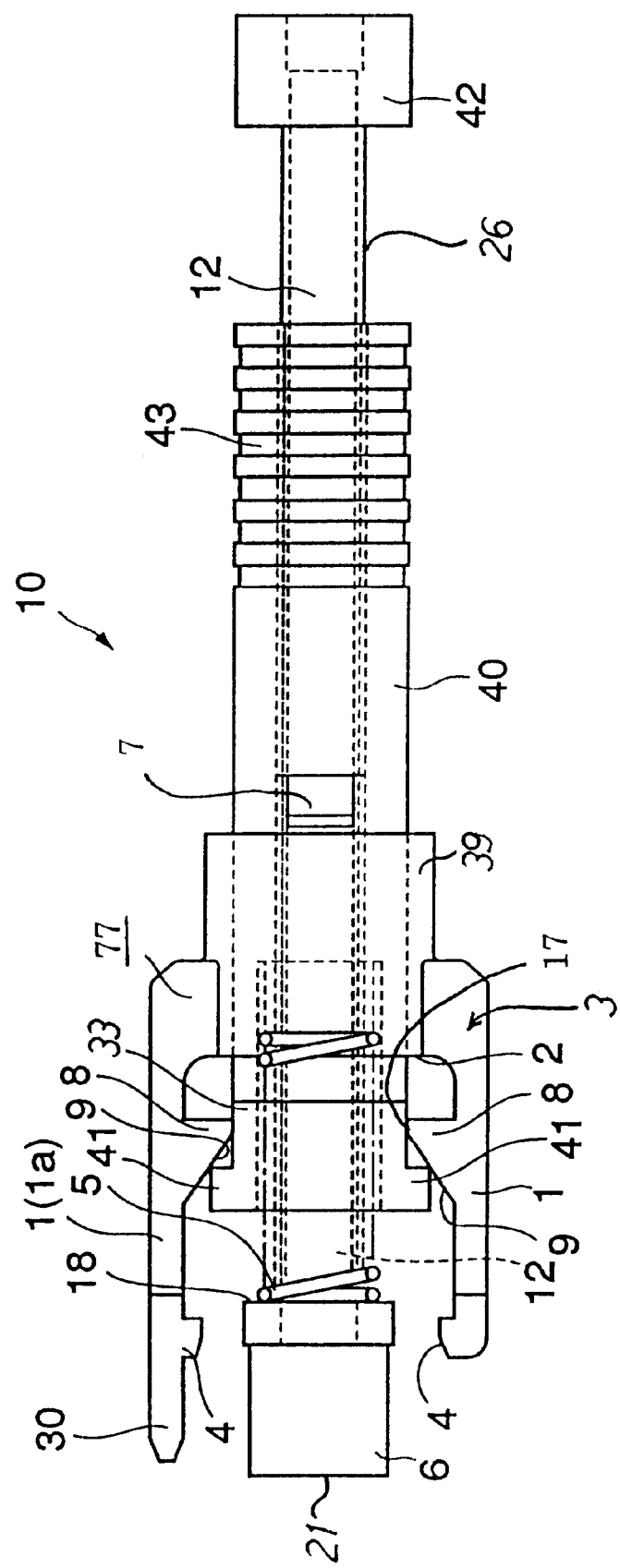
FIG. 1 is a plan constructional view showing a first embodiment of an optical connector in the present invention.
Figure 2:
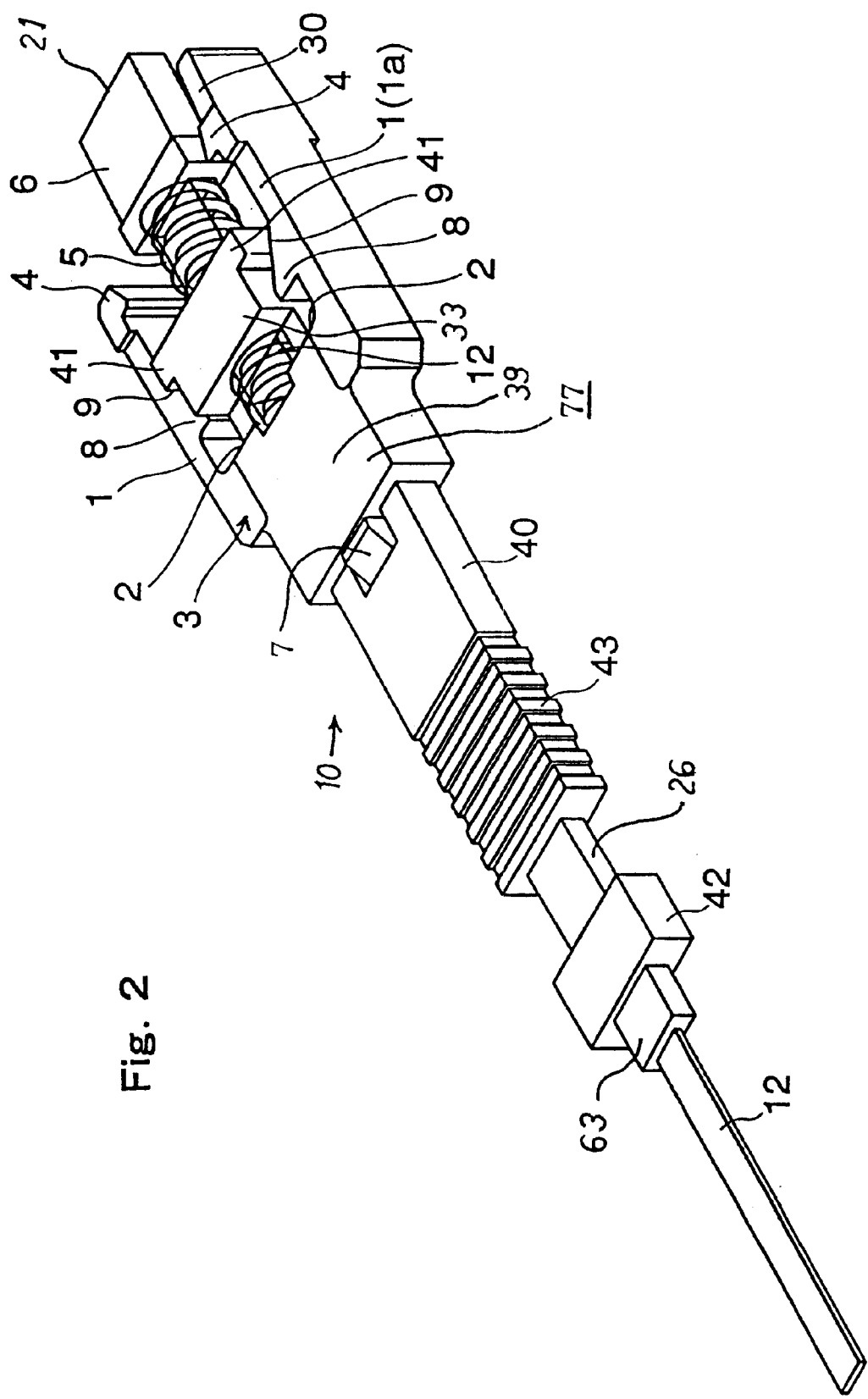
FIG. 2 is a perspective constructional view of the optical connector of the above first embodiment.

FIG. 1 shows a first embodiment of an optical connector having an optical connector housing in the invention by a plan view. FIG. 2 shows a perspective view of this optical connector.

As shown in these figures, the optical connector 10 of the first embodiment has an optical connector housing 3. This optical connector housing 3 is a structure body in which an arm side member 77 and a slider 40 are combined. The arm side member 77 has arm portions 1 extending forward from both end sides of a base end wall 39 on its face 2. A ferrule 6 of the optical connector 10 is accommodated between the arm portions 1. A claw portion 4 as an engaging portion engaged with a connecting partner side (e.g., an optical part) is formed in a tip portion of each arm portion 1. The tip of the arm portion 1 (1*a*) on one side is extended forward from a forming portion of the claw portion 4 so that an arm extending portion 30 is formed.

A projecting portion 8 projected on the inside is arranged in an inner wall of each arm portion 1 of the optical connector housing 3. A taper face of this projecting portion 8 forms a cam following face 9 for angularly opening the arm portion 1 when an opening angle driving cam member 33 is pulled onto a side of the face 2 on a base end side. This cam following face 9 further has a stationary face 17 flatly extending backward from a rear end of the taper face.

A biasing member for biasing the ferrule 6 on a connecting partner side is arranged in the optical connector 10 between a rear end face 18 of the ferrule 6 and the face 2 of the base end wall 39. In this embodiment, a coil spring 5 is used as the biasing member.

The optical connector housing 3 has a slider 40. A tip side of this slider 40 extends through the base end wall 39 between the arm portions 1, and is inserted between the arm portions 1. The opening angle driving cam member 33 is connected to the tip of the slider 40. An insertion hole is communicated and formed in the slider 40 and the opening angle driving cam member 33. In this embodiment, an optical fiber ribbon 12 guided from the rear end of the ferrule 6 through this insertion hole is pulled outside the optical connector housing 3 (outside the slider 40). A sleeve-shaped member 26 for covering the optical fiber ribbon 12 is arranged in a pulling-out passage of this optical fiber ribbon 12. The optical fiber ribbon 12 is pulled outside the slider 40 from the rear end side of the ferrule 6 through this sleeve-shaped member 26. The insertion hole of the opening angle driving cam member 33 is larger than that of the slider 40. The spring 5 is arranged by extending through the insertion hole of the opening angle driving cam member 33, and the optical fiber ribbon 12 is inserted into a central hole of this spring 5. The slider 40 is arranged in the optical connector housing 3 in an extraction preventing state such that this slider 40 is freely moved forward and backward in an extending direction of the arm portion 1 of the optical connector housing 3. In FIGS. 1 and 2, reference numeral 42 designates a slider stopper. Reference numeral 7 designates a projection arranged such that this projection is supported in a cantilever shape on a surface side of the slider 40. This projection 7 abuts on the rear end face of the base end wall 39 so that forward extraction of the slider 40 from the base end wall 39 is prevented. In these figures, reference numeral 63 designates a boot such as rubber for protecting the optical fiber ribbon 12.

A projecting portion 41 abutting on the taper face of the cam following face 9 formed in the arm portion 1 of the optical connector housing 3 and operating the optical connector housing 3 so as to be angularly opened is formed on each of both sides of the opening angle driving cam member 33 when the slider 40 is pulled and moved on a rear side. In this embodiment, an outside surface (a top face) of the projecting portion 41 is formed as a flat face, and the flat face of this projecting portion 41 and a stationary face 17 of the cam following face 9 are formed as faces substantially parallel to each other. For example, the slider 40 is pulled and moved on the rear side by directly gripping and pulling a gripping portion 43 of the slider 40 backward.

Figure 3A:
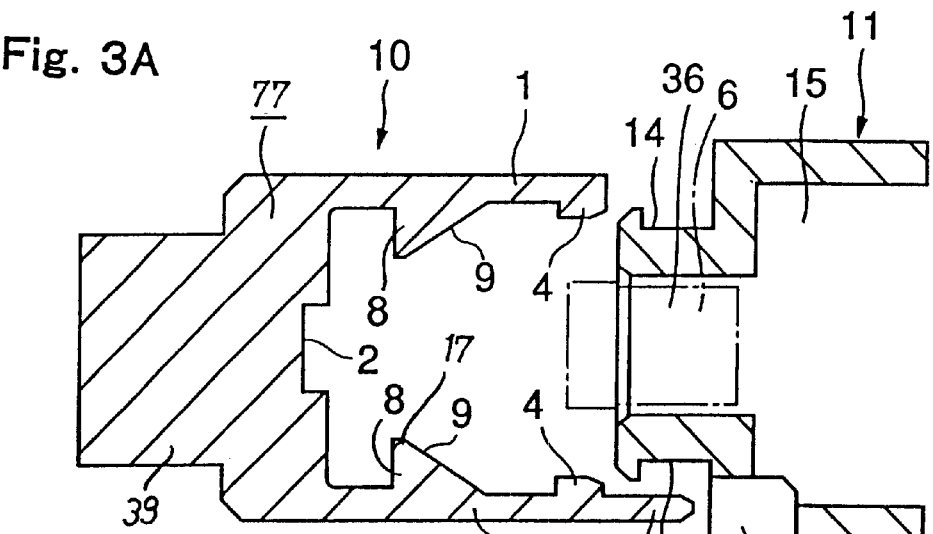
FIGS. 3A, 3B and 3C are explanatory views showing a connecting method of the optical connector of the above first embodiment and a connecting partner side by sectional views.
Figure 3B:
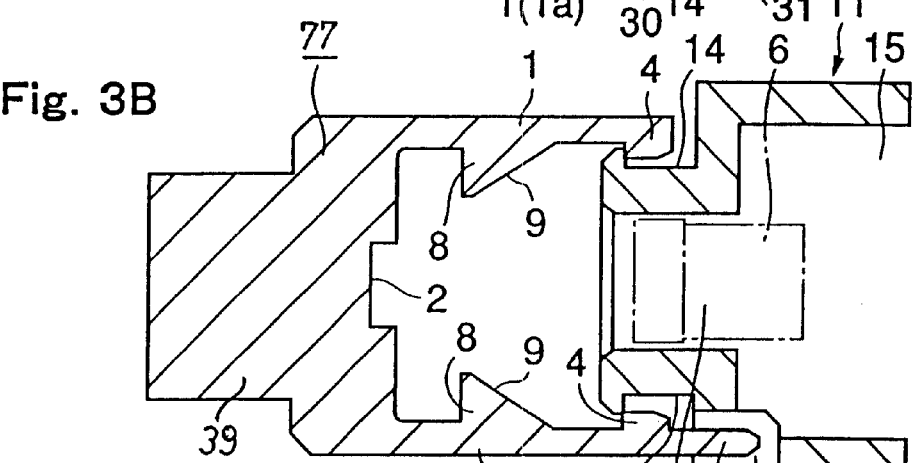
Figure 3C:
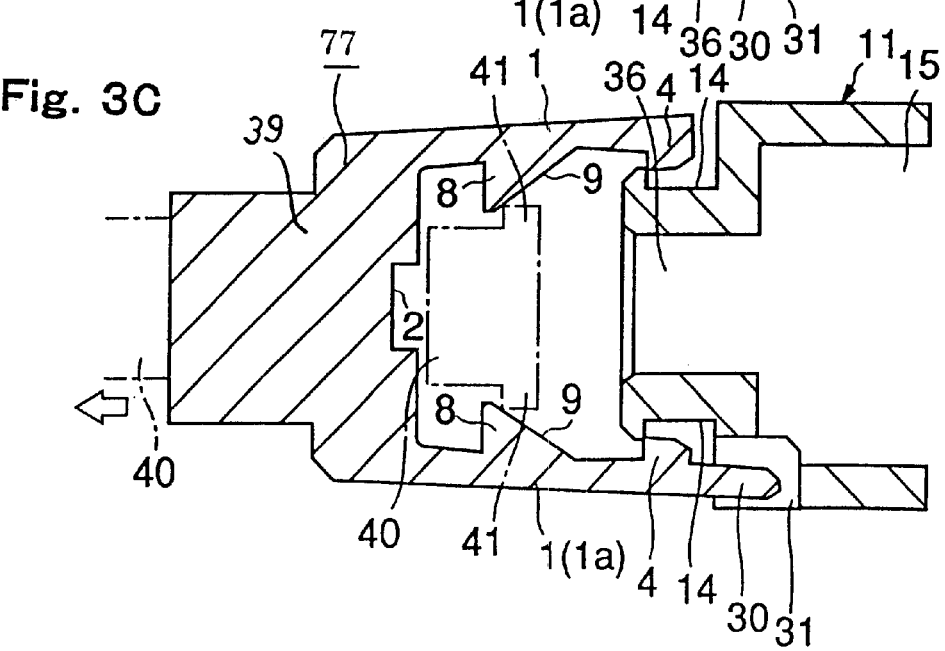

The optical connector 10 of the first embodiment is constructed as mentioned above. A connecting structure of the optical connector of the first embodiment and a connecting partner (here an optical part) will next be explained on the basis of FIGS. 3A to 3C. In FIGS. 3A and 3B, only the arm side portion 77 and the ferrule 6 are shown in the optical connector 10, and the other constructions are omitted. In FIG. 3C, only the arm side member 77 and the slider 40 having the opening angle driving cam member 33 are shown in the optical connector 10, and the other constructions are omitted.

Figure 4:
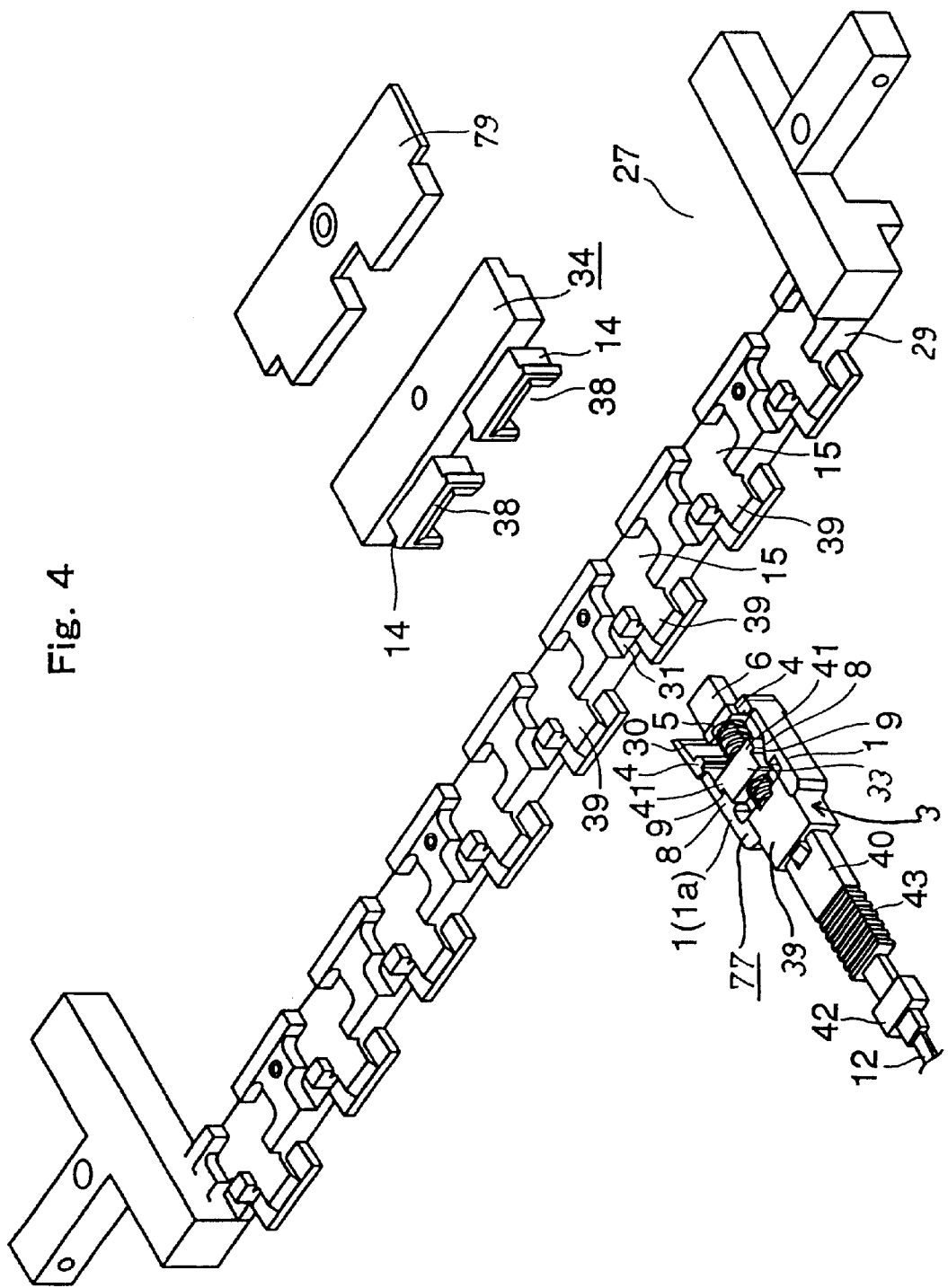
FIG. 4 is an explanatory view showing constructions of the optical connector of the above first embodiment and the connecting partner side by a perspective view.

In the example shown in FIGS. 3A to 3C, an optical module accommodating part 11 accommodating an unillustrated optical module thereto is set to a connecting partner side (a connecting object side). The optical module is accommodated to an accommodating portion 15 of the optical module accommodating part 11. For example, this optical module has a package of an MT ferrule type. Further, for example, as shown in FIG. 4, the optical module accommodating part 11 is formed by fitting a connector case upper portion 34 to a connector case lower portion 29 fixed onto a substrate 27. In the example shown here, the connector case lower portion 29, the connector case upper portion 34 and a cover 79 are fixed by screws. The optical module accommodating part 11 of this construction is formed in a mode in which plural ferrule insertion portions 39 each having an opening portion 38 of a rectangular shape are arranged side by side.

As shown in FIGS. 3A and 4, an engagement receiving portion 14 engaged with the claw portion 4 of the optical connector 10 and a fitting concave portion 31 fitting the arm extending portion 30 of the optical connector 10 thereinto are arranged in the optical module accommodating part 11.

When the optical connector 10 of the first embodiment is connected to a connecting partner side optical part, the arm extending portion 30 of the optical connector housing 3 of the optical connector 10 is opposed to the fitting concave portion 31 of the optical module accommodating part 11 as shown in FIG. 3A. Then, as shown in FIG. 3B, the arm extending portion 30 of the optical connector housing 3 is fitted to the fitting concave portion 31. The optical connector 10 and the optical module accommodating part 11 are connected to each other by engaging the claw portion 4 of the optical connector 10 with the engagement receiving portion 14 of the optical module accommodating part 11.

In the first embodiment, if it is intended that the optical connector 10 is inserted into the optical module accommodating part 11 in a state in which front and rear sides of the optical connector 10 are reversely set, the arm extending portion 30 of the optical connector housing 3 collides with the optical module accommodating part 11. Accordingly, a further movement of the optical connector 10 onto a side of the optical module accommodating part 11 is prevented so that no optical connector 10 is connected to the optical module accommodating part 11 in the reverse state with respect to the front and rear sides.

When the optical connector 10 is detached from the optical module accommodating part 11, the slider 40 is pulled and moved onto the rear side as shown in FIG. 3C. Thus, the projecting portion 41 of the opening angle driving cam member 33 abuts on the cam following face 9 of the arm portion 1 of the optical connector housing 3 so that the arm portion 1 is angularly opened. Then, the connection of the optical connector 10 and the optical module accommodating part 11 is released by disengaging the claw portion 4 from the engagement receiving portion 14.

As shown in FIG. 4, the optical module accommodating part 11 has plural ferrule insertion portions 39, and the optical module is accommodated into each accommodating portion 15 so that the optical module and the optical connector 10 of this embodiment can be mounted at high density. When a cover 25 is arranged, a connecting portion of the optical connector 10 and the optical module accommodating part 11 can be protected.

In accordance with the first embodiment, as mentioned above, the optical connector 10 and the optical module accommodating part 11 can be connected to each other only by engaging the claw portion 4 arranged at a tip of the arm portion 1 of the optical connector housing 3 with the engagement receiving portion 14 of the optical module accommodating part 11. Therefore, the optical connector 10 can be very easily connected to the optical module accommodating part 11.

Further, in accordance with the first embodiment, the tip of the arm portion 1a on one side of the optical connector housing 3 is extended forward from a forming portion of the claw portion 4 so that the arm extending portion 30 is formed. Since this arm extending portion 30 is fitted to the fitting concave portion 31 of the optical module accommodating part 11, it is possible to avoid that the optical connector 10 is reversely connected in error with respect to the front and rear sides. Therefore, the optical connector 10 can be accurately connected to the optical module accommodating part 11 for a short time.

Further, in accordance with the first embodiment, when the connection of the optical connector 10 and the optical module accommodating part 11 is released, the tip side of the arm portion 1 of the optical connector housing 3 is opened only by pulling and moving the slider 40 on the rear side so that the connection of the optical connector 10 and the optical module accommodating part 11 can be released. Therefore, the optical connector 10 and the optical module accommodating part 11 can be very easily connected detachably to each other without requiring any very complicated work using a dedicated connection jig, etc. as in the conventional case.

Accordingly, the optical connector 10 of the first embodiment can be accurately detachably connected to the optical module accommodating part 11 arranged at high density. Further, an optical fiber arranged in the optical connector 10 can be integrated at high density.

Further, in the first embodiment, as mentioned above, the optical connector housing 3 and the optical connector 10 are very simply constructed so that the optical connector 10 and the optical connector housing 3 can be manufactured very easily and cheaply in cost.

Figure 5:
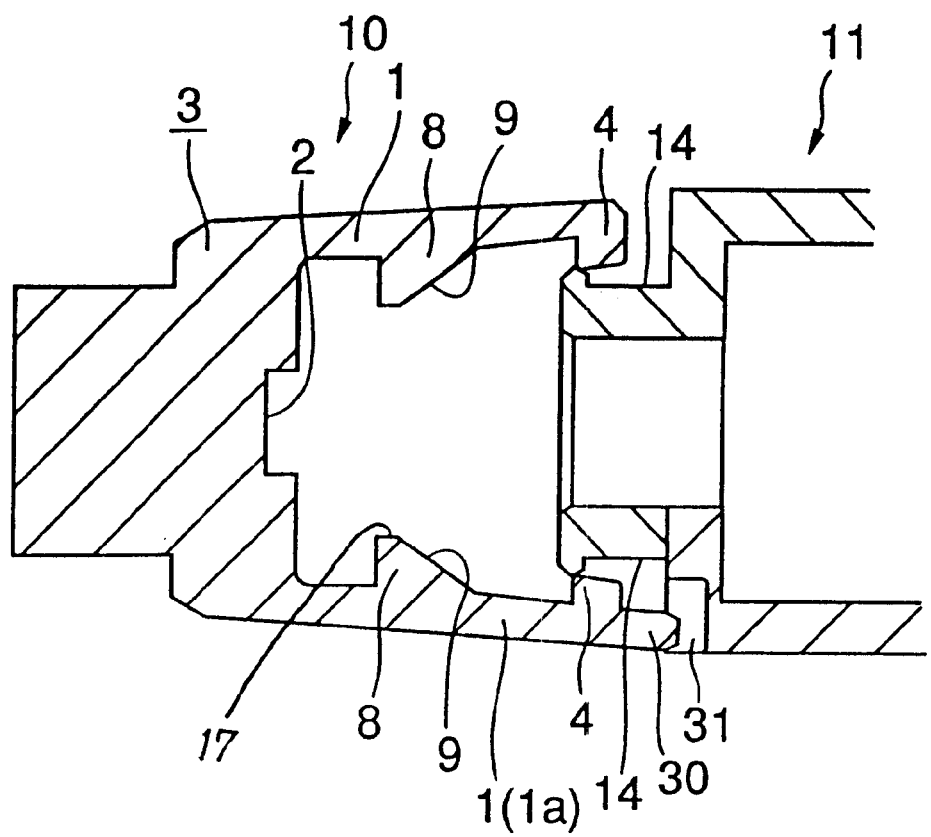
FIG. 5 is an explanatory view showing a connecting structure of another embodiment of the optical connector in the invention by partially omitting the construction of the optical connector.

Various other constructional modes can be adopted as substitution examples of the first embodiment. For example, the length of the arm extending portion 30 formed in the arm portion 1 on one side of the optical connector housing 3 is not particularly limited, but can be set to a different length. For example, as shown in FIG. 5, the arm extending portion 30 may be also formed shortly in comparison with the first embodiment. FIG. 5 shows only the optical connector housing 3 of the optical connector 10, but the other constructions are similar to those in the above first embodiment.

Further, in the above first embodiment, the side of a connecting end face 21 of the ferrule 6 is arranged on a forward side from the tip of the arm portion 1 of the optical connector housing 3, but the tip of each arm portion 1 of the optical connector housing 3 may be also reversely extended on the forward side from the connecting end face 21 of the ferrule 6.

Further, in the above first embodiment, the slider 40 is arranged in a mode in which the slider 40 covers an outer circumferential side of the optical fiber ribbon 12 pulled out of the rear end side of the ferrule 6, but may be also arranged in a mode in which the slider 40 nips the optical fiber ribbon 12 from its both sides.

Further, in the above first embodiment, the optical connector 10 is connected to the optical module accommodating part 11, and the ferrule 6 is connected to the optical module accommodated to the optical module accommodating part 11. However, no optical part on the connecting partner side connected to the optical connector may be also set to a module mode. Further, the connecting partner connected to the optical connector may be set to an optical connector (a separate optical connector), and may be also set to an adapter.

Further, no arm extending portion 30 may be arranged at the tip of the arm portion 1 of the optical connector 10, and no stationary face 17 may be arranged on the cam following face 9.

Further, it is not limited that the optical connector has the ferrule of the MT type, but a shape, a size, etc. of the optical connector can be arbitrarily set in accordance with design. The ferrule 6 of the optical connector may be also set to a cylindrical ferrule of a single core. At this time, a sleeve is used as in the conventional case to fit the ferrules to each other.

FIG. 8 shows a second embodiment of the invention. This second embodiment differs from the first embodiment in that the connecting partner (connecting object) of the optical connector 10 is set to an optical part 16 of a receptacle type, and the length of the stationary face 17 of the cam following face 9 of the projecting portion 8 arranged on an internal surface of the arm portion 1 is set to be relatively long, and the arm extending portion 30 formed forward from the arm portion 1 on one side in the embodiment 1 is omitted. The other constructions are similar to those in the first embodiment, and reference numerals common to the first embodiment are used in portions common to the first embodiment.

An optical fiber ribbon 12 having plural optical fibers arranged side by side is inserted and fixed to a ferrule 6 such as an MT ferrule from its rear end face. An unillustrated optical fiber insertion hole is formed on a tip side of this ferrule 6. The coating of a tip side of the optical fiber ribbon 12 is removed so that the optical fiber is exposed. This optical fiber is inserted and fixed to the optical fiber insertion hole. A tip face of the optical fiber is exposed to a connecting end face 21 of the ferrule 6. An unillustrated guide pin insertion hole is formed on this connecting end face 21.

Reference numeral 16 designates an optical part such as an MT interface having a package of the MT ferrule type. For example, this optical part 16 is connected to a substrate side optical module, etc. An engagement receiving portion 14 engaged with a claw portion 4 of the optical connector housing 3 is arranged in this optical part 16. An unillustrated optical fiber connected to the optical fiber of the ferrule 6 is arranged on a connecting end face 20 of the optical part 16. Reference numeral 22 designates a guide pin inserted into the guide pin insertion hole formed in the ferrule 6.

When the slider 40 is moved backward in this optical connector housing 3, a projecting portion 41 of the opening angle driving cam member 33 abuts on a taper face of the cam following face of the arm portion 1, and the arm portion 1 is operated so as to be angularly opened. When the slider 40 is further moved backward, a flat face of the projecting portion 41 and the stationary face 17 of the cam following face 9 abut and hold the opening angle of the arm portion 1.

Accordingly, the opening angle of the arm portion 1 is reliably held by making the projecting portion 41 abut on the stationary face 17 instead of the taper face so that the connection can be easily released.

A cross-sectional face of the opening angle driving cam member 33 is formed such that this cross-sectional face is larger than an insertion hole of a base end wall 39. Therefore, when the slider 40 is moved backward, a rear end face of the opening angle driving cam member 33 abuts on a face 2 of the base end wall 39 between the arm portions 1. Accordingly, no slider 40 is detached from the base end wall 39. Further, when the slider 40 is moved forward, a projection 7 abuts on a rear end face of the base end wall 39 so that no slider 40 is detached from the base end wall 39 between the arm portions 1.

Figure 12:
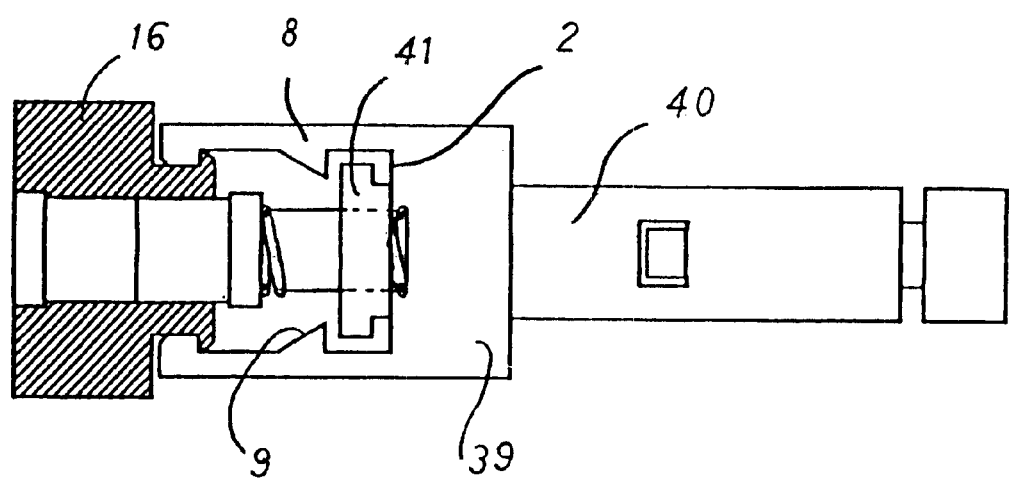
FIG. 12 is an explanatory view showing an unpreferable releasing situation example of the connection of the optical connector using the optical connector housing and the connecting partner side.

Further, when the slider 40 is moved and the rear end face of the opening angle driving cam member 33 abuts on the face 2 of the base end wall 39, a projecting portion 41 arranged in the opening angle driving cam member 33 is formed such that this projection portion 41 reliably abuts on the stationary face 17 of the cam following face 9 on a side of the arm portion 1. Accordingly, no problem that the projecting portion 41 of the opening angle driving cam member 33 gets over the projecting portion 8 of the arm portion 1 and enters between the projecting portion 8 and the basic end face 2 (see FIG. 12) is caused.

Figure 9A:
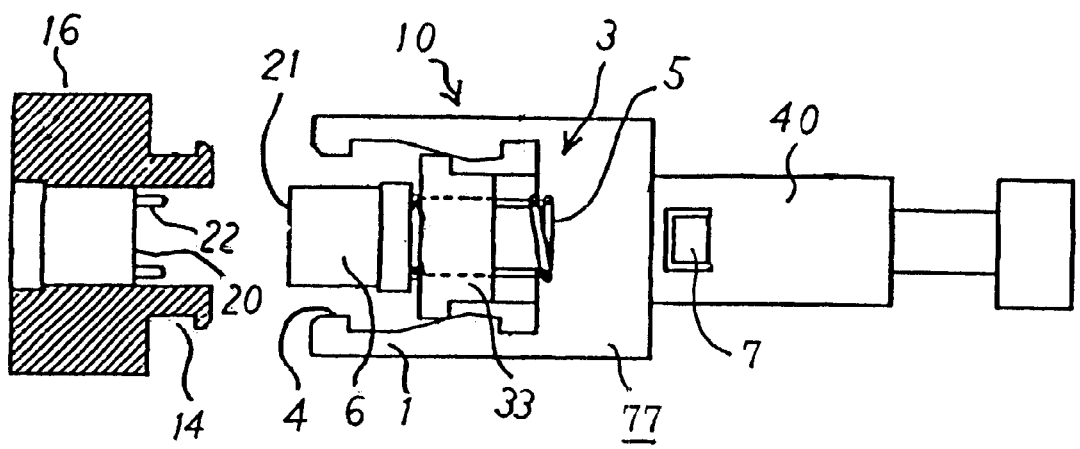
FIGS. 9A, 9B and 9C are explanatory views showing a connecting method of the optical connector of the above second embodiment and a connecting partner side.
Figure 9B:
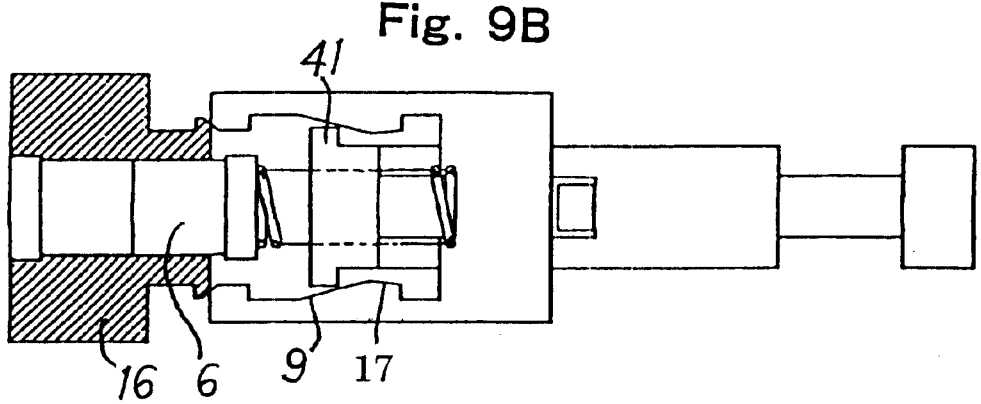
Figure 9C:
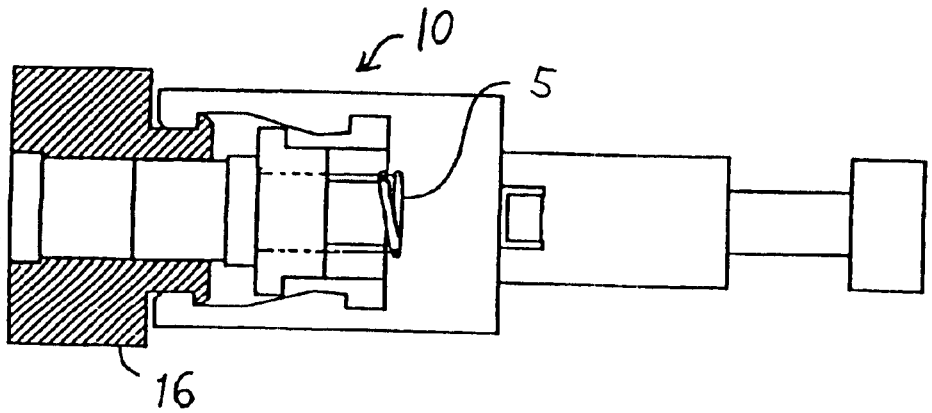

A connecting structure of the optical connector and the optical part in the second embodiment will next be explained. First, as shown in FIG. 9A, the optical connector housing 3 of the optical connector 10 is opposed to a side of the optical part 16. Then, the optical connector 10 is moved onto the side of the optical part 16. As shown in FIG. 9B, the guide pin 22 of the optical part 16 is inserted into the guide pin insertion hole of the ferrule 6, and the respective connecting end faces 21 and 20 abut and the ferrule 6 and the optical part 16 are connected to each other. Then, as shown in FIG. 9C, the engagement receiving portion 14 and the claw portion 4 are engaged with each other so that the optical part 16 and the optical connector 10 are completely connected to each other.

At this time, a spring 5 biases the claw portion 4 in a direction opposed to the optical part 16 as a connecting partner in an engaging state of the claw portion 4 and the engagement receiving portion 14 so that this engagement is firmly performed. Further, since the spring 5 biases the ferrule 6 on a connecting partner side, the optical connector 10 and the optical part 16 are reliably connected to each other with respect to the optical fiber.

Figure 10A:
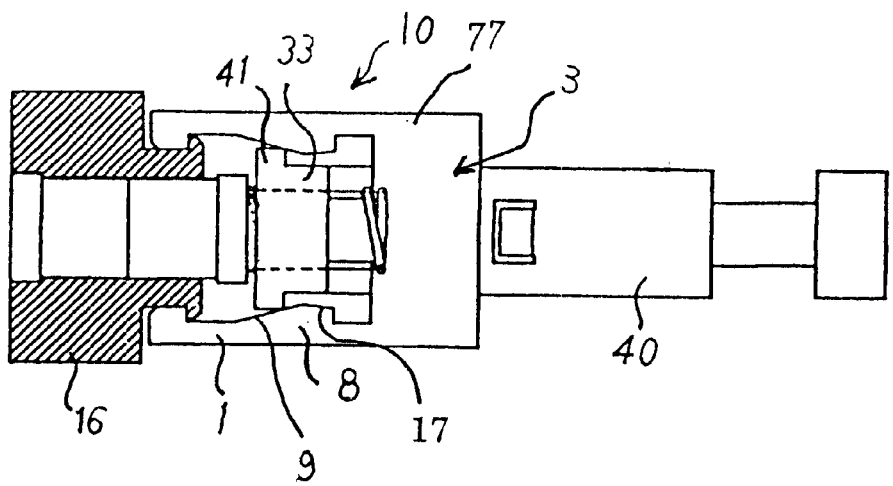
FIGS. 10A, 10B and 10C are explanatory views showing a releasing method of the connection of the optical connector of the above second embodiment and the connecting partner side.
Figure 10B:
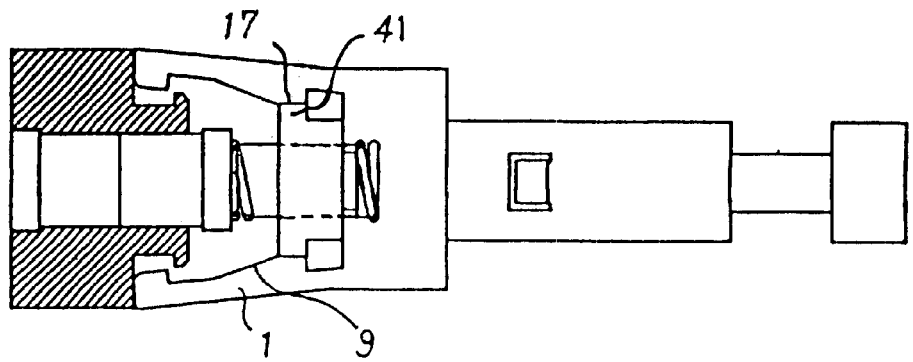

Next, when the optical connector 10 is detached from the optical part 16, a gripping portion 43 is gripped and pulled so that the slider 40 is moved to the rear side. As shown in FIG. 10A, the projecting portion 41 arranged in the opening angle driving cam member 33 abuts on the taper face (the taper face of the cam following face 9) of the projecting portion 8 arranged in the arm portion 1 of the optical connector housing 3. Further, the slider 40 is moved backward so that the arm portion 1 is operated so as to be angularly opened. Thus, as shown in FIG. 10B, the projecting portion 41 and the stationary face 17 of the cam following face 9 abut and the opening angle of the arm portion 1 is stably held.

Figure 10C:
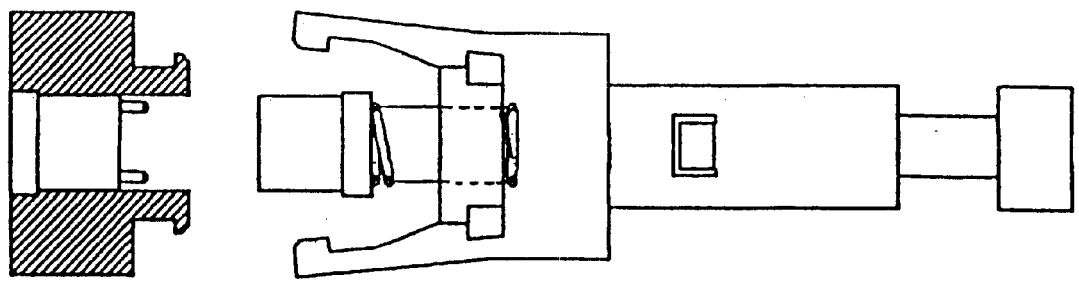

At this time, the projecting portion 41 abuts on the stationary face 17 instead of the taper face of the cam following face 9 for angularly opening the arm portion 1, and holds its opening angle so that the opening angle of the arm portion 1 is stably held. Therefore, as shown in FIG. 10C, its connection can be simply released.

Figure 11:
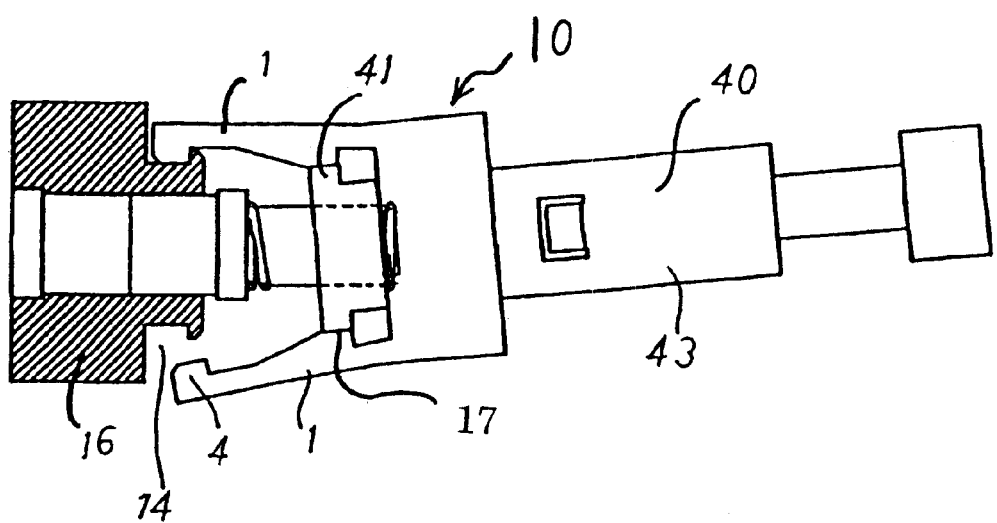
FIG. 11 is an explanatory view showing the releasing method of the connection of the optical connector of the above second embodiment and the connecting partner side in a separate situation.

As shown in FIG. 11, even when no engagement of one arm portion 1 is released, the projecting portion 41 and the stationary face 17 maintain an abutting state and the opening angle of the arm portion 1 is reliably held. Therefore, it is easy to grip the gripping portion 43 and correct posture of the optical connector 10, and its connection can be easily released.

As explained above, in accordance with the second embodiment, the slider 40 is moved to the rear side, and the arm portion 1 is operated so as to be angularly opened by abutting the projecting portion 41 arranged in the opening angle driving cam member 33 and the taper face of the cam following face 9 arranged in the arm portion 1. Further, the opening angle of the arm portion 1 is held by abutting the projecting portion 41 and the stationary face 17 of the cam following face 9 so that the opening angle of the arm portion 1 is stably held and the connection of the optical connector 10 and the optical part 16 can be easily released.

Accordingly, the optical connector 10 of the second embodiment can be detachably connected to the optical part 16 without using any special jig. Thus, since no arranging space of the jig is required, the optical fiber arranged in the optical connector 10 can be integrated at high density. Therefore, an entire connecting structure aggregate can be made compact.

Further, the construction of the optical connector housing 3 and the optical connector 10 is very simple as mentioned above. A connecting device of the optical connector 10 and the optical part 16 can be arranged at very high density since no jig is required.

In the above example, the top face of the projecting portion 41 is set to a flat face, but may not be necessarily set to the flat face. However, if the top face of the projecting portion 41 is set to the flat face and this flat face and the stationary face 17 of the cam following face 9 abut such that the flat faces come in face contact with each other, the opening angle of the arm portion 1 can be preferably held more reliably.

The ferrule 6 applied to the invention is not limited to the MT ferrule, etc., but the ferrule of a cylindrical type may be also used.

Further, the optical part on the connecting partner side (connecting object side) connected to the optical connector 10 of this second embodiment may have another construction, and is suitably selected and set in accordance with its specification, etc. The optical part as the connecting partner of the optical connector 10 may be set to an optical connector, and a connecting mode with these optical parts may be also set through an adapter. The connecting mode set through the adapter is a mode in which the adapter is connected to the optical connector 10 and the optical part as the connecting part is connected to this adapter, and the optical connector 10 and the connecting partner are connected.

As a substitution embodiment, after the optical connector 10 and the optical part 16 are connected by engaging the claw portion 4 and the engagement receiving portion 14 with each other, an unillustrated cover is arranged in the optical connector 10. For example, the cover can be simply arranged in the optical connector 10 if screws are fastened on a side of the optical part 16, etc. When the connection of both the optical connector 10 and the optical part 16 is released, this cover is detached.

In this second embodiment, similar to the first embodiment, the arm extending portion 30 may be also arranged on a tip side of the arm portion 1 on one side. In this case, a fitting concave portion 31 fitting the arm extending portion 30 thereinto is arranged on the side of the optical part 16.

Figure 13:
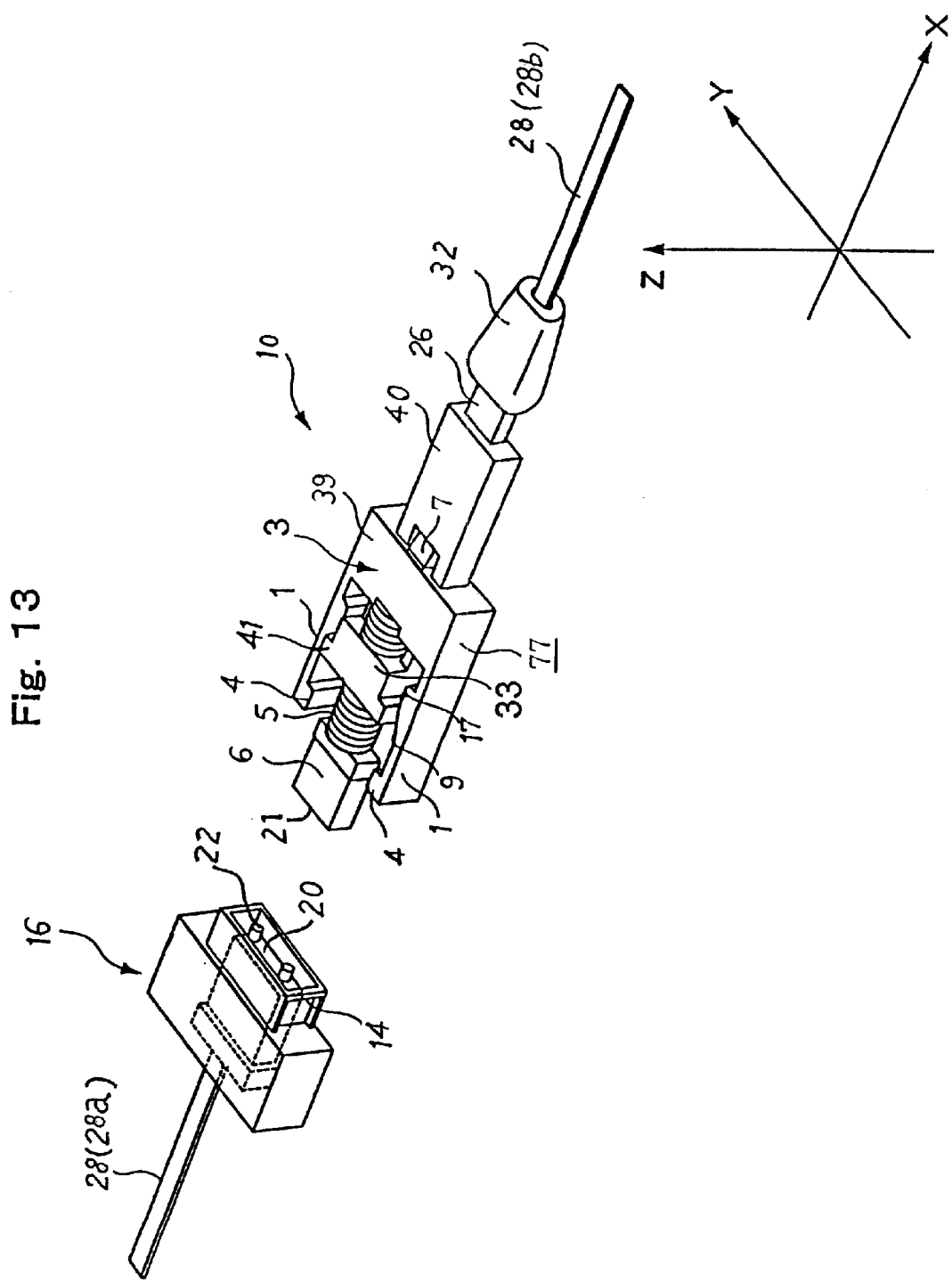
FIG. 13 is a perspective view showing the relation of an optical connector in a third embodiment of the invention and an optical part of the connecting partner.

FIG. 13 shows a third embodiment of the optical connector 10 in the invention together with the optical part 16 as the connecting partner. This third embodiment differs from the second embodiment in that, in the optical connector 10 of this third embodiment, the optical fiber connected to the ferrule 6 is set to an optical fiber cord 28 instead of the optical fiber ribbon 12 in the second embodiment, and a means for restraining tensile force of the optical fiber cord 28 from being applied to the optical fiber is arranged when the optical fiber cord 28 is pulled backward. The other constructions are similar to those in the second embodiment.

The connecting partner of the optical connector 10 in this third embodiment is set to an optical part 16 similar to that in the second embodiment.

Figure 14A:
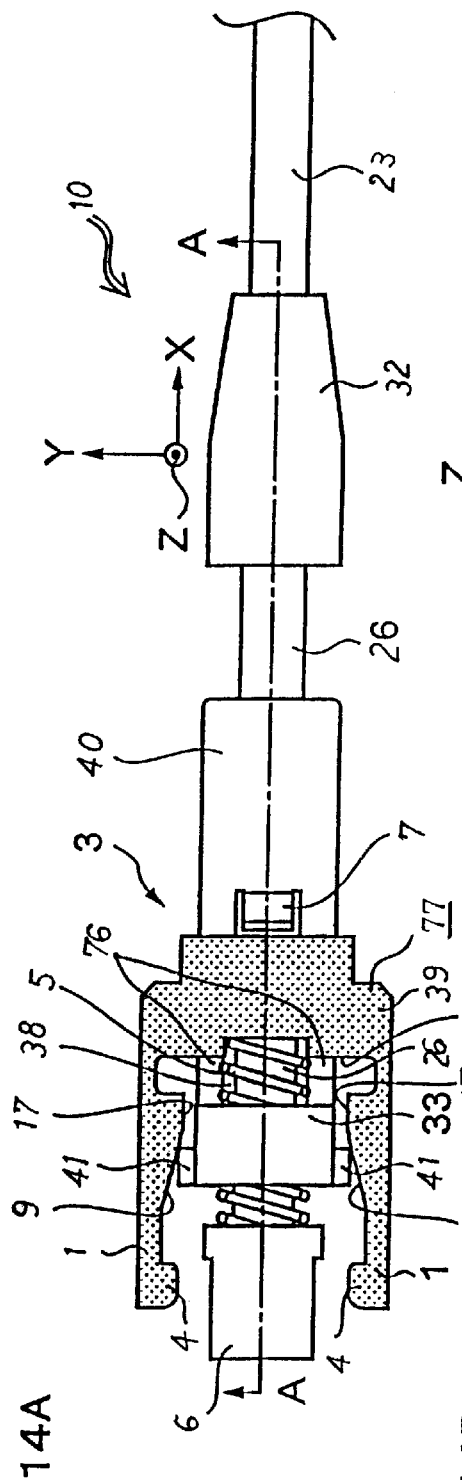
FIGS. 14A, 14B and 14C are explanatory views of the optical connector of the above third embodiment.
Figure 14B:
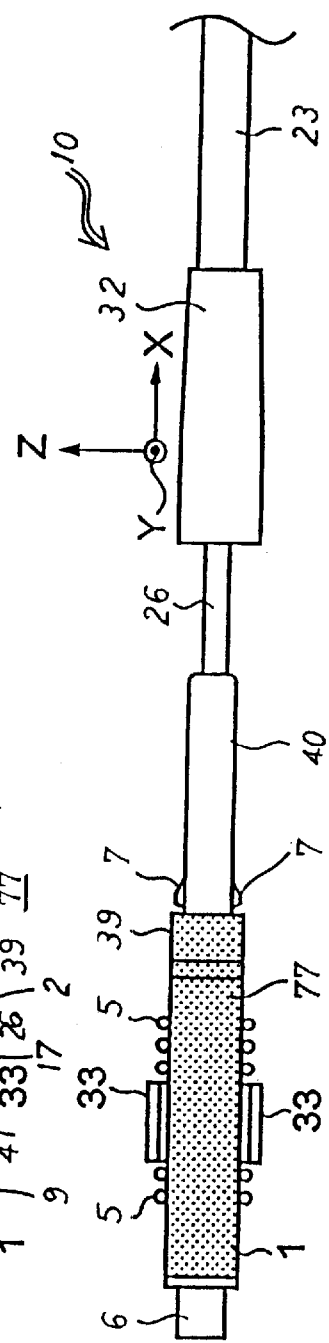
Figure 14C:
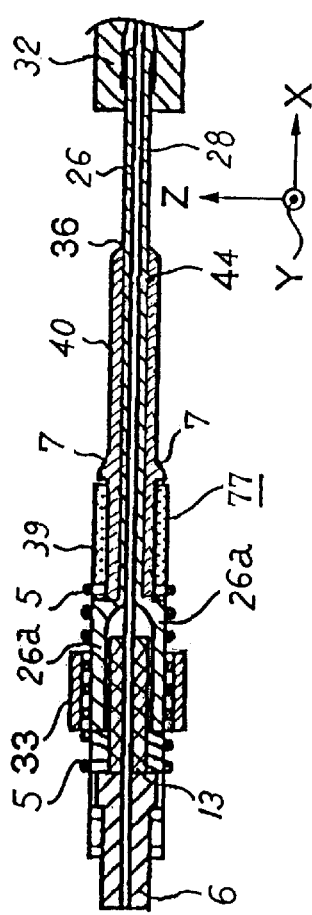
Figure 15A:
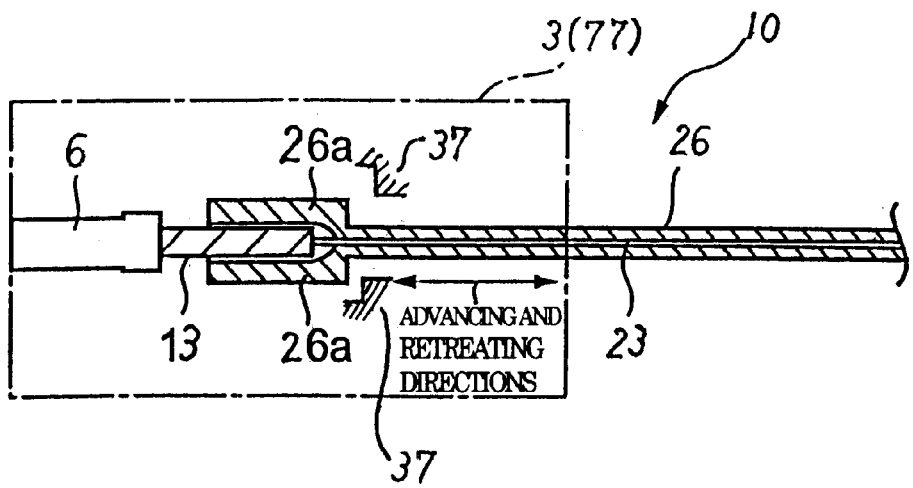
FIGS. 15A and 15B are explanatory views extracting and showing a portion of the optical connector of the third embodiment.
Figure 15B:
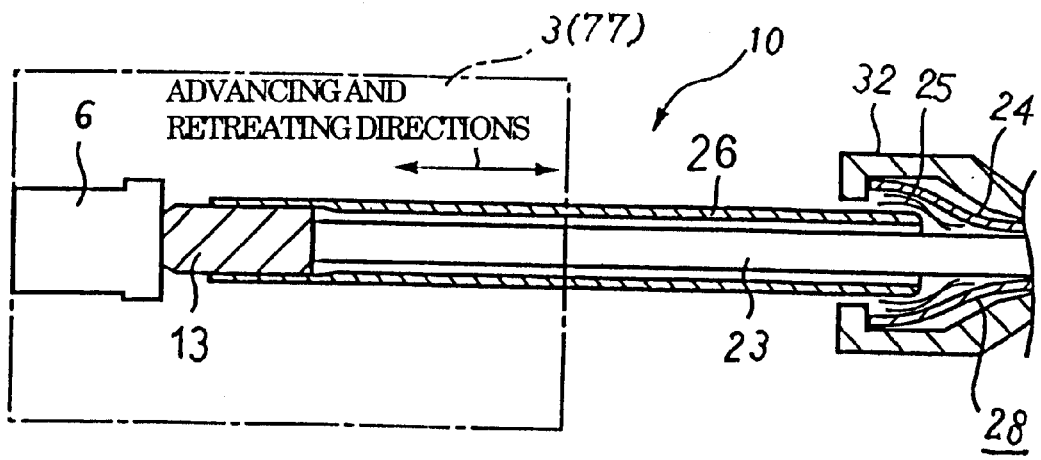

The construction of the optical connector housing 3 of the optical connector 10 in the third embodiment is approximately similar to that in the second embodiment. Accordingly, overlapping explanations of common portions are omitted and constructions different from those in the second embodiment will be emphatically explained. FIG. 14A shows a plan view in which the optical connector 10 shown in FIG. 13 is seen from an upper side. FIG. 14B partially sectionally shows a side view of this optical connector 10. FIG. 14C shows a sectional view of an A—A portion shown in FIG. 14A. FIGS. 15A and 15B show the construction of the tensile restraining means for restraining the tensile force of the optical fiber cord 28 from being applied to the optical fiber when the optical fiber cord 28 is pulled backward. In FIGS. 15A and 15B, the slider 40 is omitted to easily understand the construction of this tensile force restraining means.

In the optical fiber cord 28 connected to the ferrule 6, an optical fiber 23 is covered with an outer cover 24 as shown in FIGS. 15A and 15B. The outer cover 24 is removed in a tip portion of this optical fiber cord 28 so that the optical fiber 23 is exposed. There are various kinds of optical fiber cords 28 in which only one optical fiber 23 is arranged, and plural optical fiber cores 23 are arranged side by side and are formed in a tape shape (the optical fiber ribbon 12 shown in FIG. 2), etc. The kind of the optical fiber 23 of the optical fiber cord 28 shown here is not limited.

In this third embodiment, a boot 13 for covering and protecting an outer circumference of the optical fiber 23 is arranged on a rear end side of the ferrule 6. The exposed optical fiber 23 pulled out of the rear end of the ferrule 6 is covered with a sleeve-shaped member 26. One end side of the boot 13 is fixed to the ferrule 6, and the other end side is fitted to a tip portion of the sleeve-shaped member 26. An unillustrated fiber insertion hole is formed in the boot 13. The optical fiber 23 exposed in the tip portion of the optical fiber cord 28 is inserted into the optical fiber insertion hole of the ferrule 6 through the interior of the sleeve-shaped member 26 and the fiber insertion hole of the boot 13, and is fixed to this ferrule 6.

In this third embodiment, the optical fiber cord 28 is constructed such that a tensile strength fiber 25 is interposed between the optical fiber 23 and the outer cover 24. As shown in FIG. 15B, an end portion of the tensile strength fiber 25 is fixed to an outer circumference of the sleeve-shaped member 26 together with an end portion of the outer cover 24. There are various techniques for fixing this outer cover 24 and the tensile strength fiber 25. Any one of these techniques may be used. For example, a fixing technique using an adhesive, a fixing technique using crimping utilizing a ring manufactured by a metal, etc. are used.

Connecting portions of such a sleeve-shaped member 26, the outer cover 24 and the tensile strength fiber 25 are covered and protected by a hood 32. This hood 32 is fixed to the sleeve-shaped member 26. For example, there is an elastic body such as rubber and elastomer as an example of a constructional material of the hood 32. Further, a thermal shrinkage tube may be also utilized.

In this third embodiment, the boot 13 and the sleeve-shaped member 26 are not fixed. The sleeve-shaped member 26 is freely moved forward and backward with respect to the boot 13. In other words, the sleeve-shaped member 26 is freely moved along a longitudinal direction of the optical fiber 23.

Thus, for example, when the optical connector 10 is connected to the connecting partner and the optical fiber cord 28 is pulled in a retreating direction with respect to the ferrule 6, the optical fiber 23 and the ferrule 6 are not displaced and the sleeve-shaped member 26 is displaced by this tensile force in the retreating direction together with the outer cover 24 of the optical fiber cord 28 and the hood 32. Therefore, the tensile force is concentratively applied to the outer cover 24, and is not applied to the optical fiber 23 and the ferrule 6. When the tip side of the sleeve-shaped member 26 is fixed to the boot 13, the tensile force of the optical fiber cord 28 is applied to the optical fiber 23 and the ferrule 6. Thus, loss of light propagated in the optical fiber 23 is varied. In contrast to this, in the third embodiment, the variation of the above light loss can be prevented since no tensile force of the optical fiber cord 28 is applied to the optical fiber 23 and the ferrule 6 as mentioned above.

Further, in this third embodiment, an engaging portion 26a is formed in a tip portion of the sleeve-shaped member 26. An engagement receiving portion 37 (see FIG. 15A) is further formed on the side of an arm side member 77 of the optical connector housing 3. When the sleeve-shaped member 26 is displaced in the retreating direction with respect to the ferrule 6, the engaging portion 26a of the sleeve-shaped member 26 is engaged with the engagement receiving portion 37 of the optical connector housing 3 by the engaging portion 26a and the engagement receiving portion 37. Thus, the movement of the sleeve-shaped member 26 in the retreating direction is stopped. Namely, a stopper means for regulating a moving allowance amount of the sleeve-shaped member 26 in the retreating direction is constructed by the engaging portion 26a of the sleeve-shaped member 26 and the engagement receiving portion 37 on the side of the arm side member 77. This moving allowance amount of the sleeve-shaped member 26 in the retreating direction is set in consideration of various points such as a shape of the optical connector housing 3. A size of this moving allowance amount is not particularly limited, but is preferably set to be small. For example, this size is desirably set to not more than 2 mm.

In this third embodiment, as shown in FIG. 14A, a hole portion 38 is formed in the slider 40 such that this hole portion 38 extends through an interval portion from a rear end of the opening angle driving cam member 33 to the projection 7 in a Z-direction. Namely, the opening angle driving cam member 33 is connected to the tip side of a wall portion 76 of an arm shape on each of both sides of the hole portion 38 so that the opening angle driving cam member 33 and the slider 40 are formed as an integral structure. Similar to the first and second embodiments, the spring 5 is inserted into an insertion hole of the opening angle driving cam member 33 and is arranged between the rear end of the ferrule 6 and the base end wall 39 between the arm portions 1.

As shown in FIG. 14C, the sleeve-shaped member 26 is projected backward from the rear end of the slider 40 through the insertion hole 44 of the slider 40 on the rear side from the engaging portion 26a. As shown in FIG. 15B, the tensile strength fiber 25 of the optical fiber cord 28 and the outer cover 24 are fixed to an outer circumferential face of the sleeve-shaped member 26 on the rear end side of this sleeve-shaped member 26.

The engaging portion 26a on the tip side of the sleeve-shaped member 26 is formed as a thick wall portion in comparison with its rear side, and is inserted into the insertion hole of the opening angle driving cam member 33. There is a very small clearance between a rear end face of the engaging portion 26a and a front end face of the base end wall 39 between the arm portions 1. When the slider 40 is moved backward within a range of this very small clearance, the rear end face of the engaging portion 26a abuts on the front end face of the base end wall 39 so that the backward movement of the slider 40 is stopped. The front end face of this base end wall 39 functions as the engagement receiving portion 37 shown in FIG. 15A. Namely, the stopper means for regulating the movement of the sleeve-shaped member 26 in the retreating direction is constructed by the rear end face of the engaging portion 26a and the front end face of the base end wall 39.

When the optical fiber cord 28 is pulled backward, the outer cover 24 is greatly moved together with the sleeve-shaped member 26 by arranging this stopper means so that a bad influence such as looseness of the outer cover 24 can be prevented.

A connecting operation of the optical connector 10 and the optical part 16 as a connecting partner in this third embodiment and a connection releasing operation are similar to those in the second embodiment. Accordingly, an overlapping explanation of these operations is omitted here.

Various embodiment modes can be adopted as a substitution example of this third embodiment. For example, in the third embodiment, the boot 13 is arranged on the rear end side of the ferrule 6, but this boot 13 may not be arranged. In this case, for example, a tip portion of the sleeve-shaped member 26 (a tip side of the engaging portion 26a) may be also further extended toward the ferrule 6. Further, in the third embodiment, the engaging portion 26a is formed in the tip portion of the sleeve-shaped member 26, but this engaging portion 26a may not be arranged. In this case, the stopper means for regulating the moving amount of the sleeve-shaped member 26 on the rear side may be arranged by a separate construction.

Further, in the third embodiment, both the outer cover 24 of the optical fiber cord 28 and the tensile strength fiber 25 are fixed to an outer circumferential portion of the sleeve-shaped member 26, but only the tensile strength fiber 25 may be fixed to the outer circumferential portion of the sleeve-shaped member 26. In these cases, effects similar to those in the third embodiment can be also obtained.

Further, in the third embodiment, the optical fiber cord 28 is constructed such that the tensile strength fiber 25 is interposed between the optical fiber 23 and the outer cover 24, but the optical fiber cord 28 of a type having no tensile strength fiber 25 may be also used.

Further, in the optical connector 10 of the third embodiment, the stationary face 17 is arranged on the cam following face 9, but this stationary face 17 may not be arranged. Further, an arm extending portion 30 similar to that in the first embodiment may be formed.

Further, the construction of a side of the optical part 16 on a connecting partner side of the optical connector 10 is not limited to the construction shown in the embodiment. Further, the connecting partner of the optical connector 10 may be also set to an optical connector. The connection of the optical connector 10 and the connecting partner may be set to a direct connecting mode, but may be also set to a connecting mode through an adapter.

Figure 16:
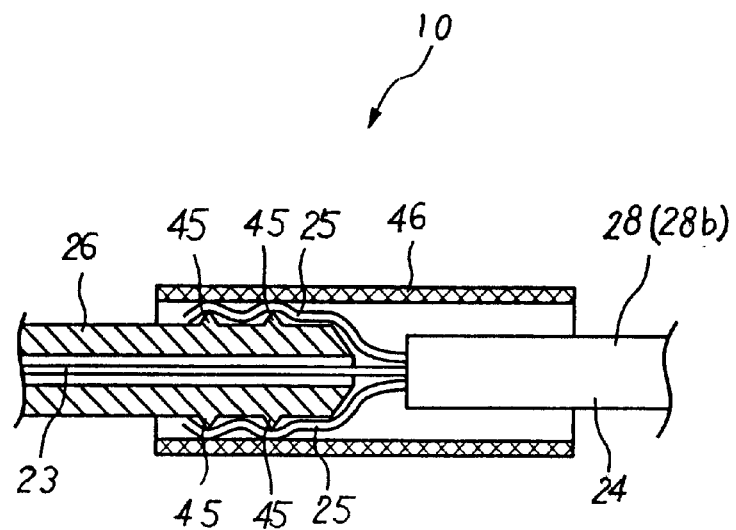
FIG. 16 is a cross-sectional view extracting and typically showing a constructional portion of an optical connector in a fourth embodiment of the invention.
Figure 17:
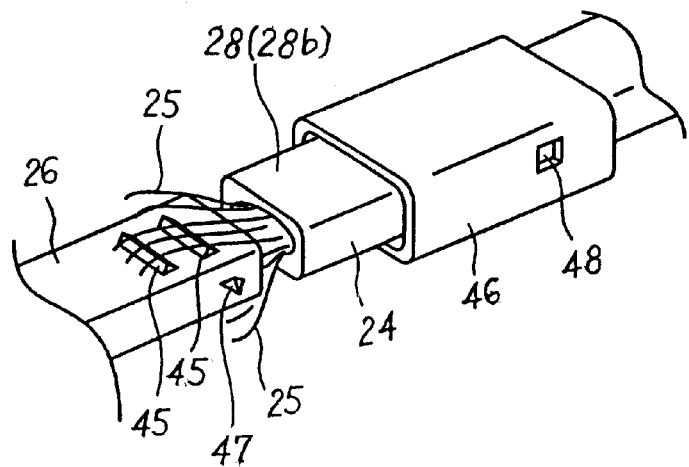
FIG. 17 is a perspective view disassembling and typically showing the constructional portion of the optical connector of the fourth embodiment.

FIGS. 16 and 17 show the partial construction of an optical connector of a fourth embodiment of the invention. This fourth embodiment differs from the third embodiment in that a fixing structure of the optical fiber cord 28 and the sleeve-shaped member 26 is set to a separate construction in the optical connector of this fourth embodiment. The other constructions are similar to those in the third embodiment.

A material of the sleeve-shaped member 26 explained so far is not particularly limited, but is set to a plastic material as one example. For example, PBT (polyethylene terephthalate) including a glass filler and PPS (polyphenylene sulfide) are more preferably adopted in view of strength when the sleeve-shaped member 26 is formed by the plastic material.

As shown in FIGS. 16 and 17, a convex portion 45 is formed on an outer circumferential face of the sleeve-shaped member 26 in its rear end portion in the optical connector 10 of the fourth embodiment. In this fourth embodiment, the sleeve-shaped member 26 is approximately formed in a rectangular shape in section. The convex portion 45 is formed in a portion (upper and bottom faces in FIGS. 16 and 17) of this sectional shape on its long side. The above exposed tensile strength fiber 25 is arranged on a top portion of this convex portion 45. In other words, the tensile strength fiber 25 is divided into upper and bottom face sides of the sleeve-shaped member 26 and is arranged on a top portion side of the convex portion 45.

Figure 18A:
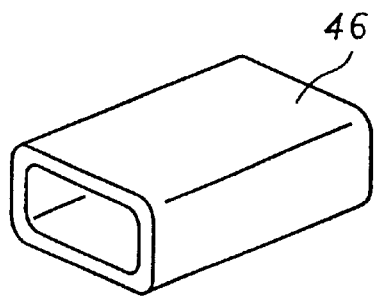
FIGS. 18A, 18B and 18C are views of various kinds of models of a member for fixation used in the optical connector of the fourth embodiment.

A member 46 for fixation having a sleeve shape of a rectangular shape in section as shown in FIG. 18A is fitted to the outside of a rear end portion of the sleeve-shaped member 26. For example, various metals such as stainless steel, a copper alloy and an aluminum alloy, a plastic material, etc. are used as an example of the material of this member 46 for fixation. Since the metal is easily formed as a thin wall in comparison with the plastic material, it is preferable to use the metal when the member 46 for fixation is reduced in thickness.

The distance between the member 46 for fixation and the top portion of the convex portion 45 of the sleeve-shaped member 26 is here set to a size (e.g., 0.1 to 0.2 mm) approximately equal to that of the tensile strength fiber 25. The tensile strength fiber 25 is nipped and fixed by the member 46 for fixation and the convex portion 45 of the sleeve-shaped member 26.

Thus, in the fourth embodiment, the optical fiber cord 28 is fixed to the sleeve-shaped member 26 by nipping and fixing the tensile strength fiber 25 by the convex portion 45 of the sleeve-shaped member 26 and the member 46 for fixation. Therefore, when the optical fiber cord 28 is fixed to the sleeve-shaped member 26, it is possible to prevent large force (e.g., crimping force) causing damage from being applied to the sleeve-shaped member 26. Thus, thin wall formation of the sleeve-shaped member 26 can be promoted. For example, since the wall thickness of the member 46 for fixation can be set to a thin thickness such as about 0.2 to 0.5 mm, the thin wall formation of the optical connector 10 on the rear side is easily promoted. When plural optical connectors 10 are arranged at high density, a space for a connector operation is secured by this thin wall formation between the optical connectors 10. Therefore, the works of the connection of the optical connectors 10 and the release of this connection are easily made so that working efficiency can be raised.

The optical fiber cord 28 can be fixed to the sleeve-shaped member 26 only by nipping the tensile strength fiber 25 by fitting the convex portion 45 of the sleeve-shaped member 26 and the member 46 for fixation. When the optical fiber cord 28 is more firmly fixed to the sleeve-shaped member 26, an adhesive may be arranged between the sleeve-shaped member 26 and the member 46 for fixation so that the tensile strength fiber 25 is fixed by both the adhesion and the nipping.

In this fourth embodiment, as shown in FIG. 17, a convex portion 47 is formed in a rear end portion of the sleeve-shaped member 26, and an opening portion 48 is formed in the member 46 for fixation. The convex portion 47 is fitted into the opening portion 48 in a state in which there is almost no clearance between the convex portion 47 and the opening portion 48. A fitting position of the sleeve-shaped member 26 and the member 46 for fixation is determined by fitting the convex portion 47 and the opening portion 48 to each other. Namely, in this fourth embodiment, a positioning means is constructed by the opening portion 48 and the convex portion 47. The opening portion 48 and the convex portion 47 also function as an extraction preventing means for preventing the member 46 for fixation from being detached from the sleeve-shaped member 26.

Figure 19:
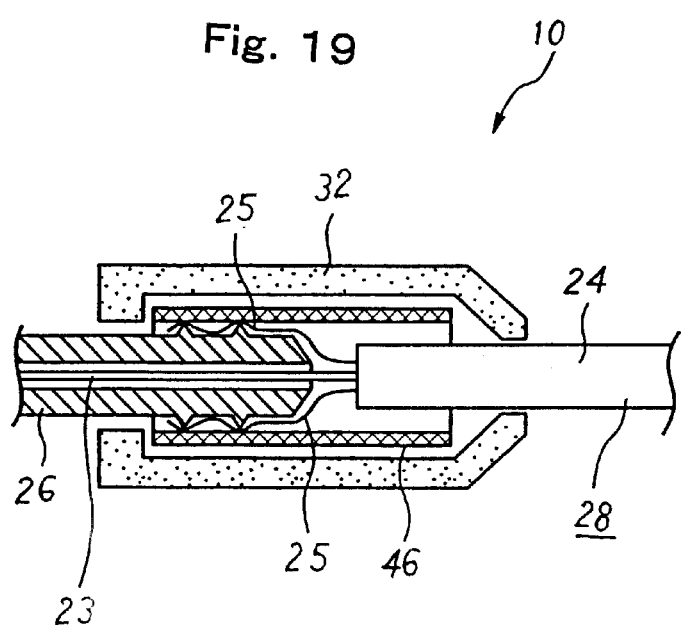
FIG. 19 is an explanatory view showing one substitution example of the fourth embodiment.

As shown in FIG. 19, a hood 32 for covering the outside of the member 46 for fixation may be also arranged.

In accordance with this fourth embodiment, the member 46 for fixation is fitted to the outside of the sleeve-shaped member 26 for covering an outer circumference of the exposed optical fiber 23 in a tip portion of the optical fiber cord 28. Irregularities are formed on at least one of an inner wall face of the member 46 for fixation and an outer circumferential face portion of the sleeve-shaped member 26 opposed to this inner wall face. The sleeve-shaped member 26 and the member 46 for fixation nip and fix the exposed tensile strength fiber 25 in the tip portion of the optical fiber cord 28 by utilizing a convex portion of these irregularities. In accordance with such a construction, it is possible to avoid that large force for crimping and fixing the outer cover 24 of the optical fiber cord 28 and the tensile strength fiber 25 to the sleeve-shaped member 26 by using a crimp ring, etc. is applied to the sleeve-shaped member.

Since no large force is thus applied to the sleeve-shaped member 26, damage of the sleeve-shaped member 26 is prevented and the thin wall formation of the sleeve-shaped member 26 can be promoted. Further, since the thin wall formation of the member 46 for fixation can be also easily performed, the thin wall formation of the optical connector 10 on the rear side can be promoted. Thus, the works of the connection of the optical connector and the release of this connection can be easily made so that working efficiency can be improved.

Other various constructional modes can be adopted as a substitution construction of this fourth embodiment. For example, in the fourth embodiment mode example, the convex portion 45 formed on the outer circumferential face of the sleeve-shaped member 26 on its rear end side is formed in a shape shown in FIG. 17, but a shape, an arranging number and an arranging position of the convex portion 45 are not limited to the construction of the fourth embodiment. In the fourth embodiment mode example, the irregularities are formed by arranging the convex portion 45 on the outer circumferential face of the sleeve-shaped member 26 on its rear end side. However, for example, the irregularities may be also formed by forming a concave portion on the outer circumferential face of the sleeve-shaped member 26.

Further, in the fourth embodiment, the irregularities are formed on the outer circumferential face of the sleeve-shaped member 26. However, for example, the irregularities may be also formed by arranging the convex portion and the concave portion on an inner wall face of the member 46 for fixation. Further, the irregularities may be also formed on both the inner wall face of the member 46 for fixation and an outer circumferential face portion of the sleeve-shaped member 26 opposed to this inner wall face. In this case, the tensile strength fiber 25 can be formed so as not to be easily detached by forming the irregularities such that the irregularities on the outer circumferential face of the sleeve-shaped member 26 and the irregularities on the inner wall face of the member 46 for fixation are fitted to each other. In this case, the irregularities on the outer circumferential face of the sleeve-shaped member 26 and the irregularities on the inner wall face of the member 46 for fixation can function as a positioning means for determining a fitting position of the sleeve-shaped member 26 and the member 20 for fixation. In this case, the opening portion 48 and the convex portion 47 can be omitted.

Further, in the fourth embodiment, no tip portion of the outer cover 24 is fixed to any portion. However, for example, a tip face of the outer cover 24 may be fixed to a rear end face of the sleeve-shaped member 26 by utilizing an adhesive, etc. Otherwise, the outer cover 26 may be also fixed to the outer circumferential face and the rear end face of the member 46 for fixation.

Further, in the fourth embodiment, an excess portion of the tip portion of the tensile strength fiber 25 exposed by removing the outer cover 24 of the optical fiber cord 28 is removed so as not to project the excess portion from the member 46 for fixation to the exterior. As another example of this projection prevention, the tip portion of the tensile strength fiber 25 may be also bent so as not to be projected from the member 46 for fixation to the exterior.

Figure 18B:
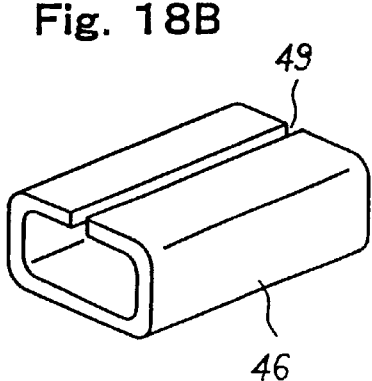
Figure 18C:
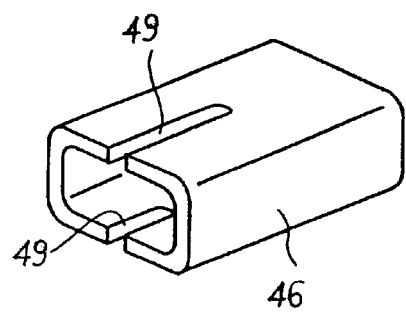

Further, in the fourth embodiment, the member 46 for fixation is formed in a mode shown in FIG. 18A, but the mode of the member 46 for fixation is not particularly limited, but the member 46 for fixation may be also set to another construction if this mode is a mode able to nip the tensile strength fiber 25 by fitting the member 46 for fixation to the sleeve-shaped member 26. For example, modes shown in FIGS. 18B and 18C may be also adopted. A slit 49 is formed along a longitudinal direction of the optical fiber cord 28 in each of these members 46 for fixation having a sleeve shape formed in a rectangular shape in section, and the member 46 for fixation is constructed such that this member 46 for fixation has a spring property. In this case, pressing force of the spring property is applied from the member 46 for fixation to the tensile strength fiber 25, and the tensile strength fiber 25 is pressed against the sleeve-shaped member 26 so that the tensile strength fiber 25 can be more firmly nipped and fixed.

Further, the substitution construction described in the third embodiment can be also applied to the optical connector 10 and the optical part 16. Further, the connecting partner of the optical connector 10 may be also set to an optical connector. A connecting mode of the optical connector 10 and the connecting partner may be set to a direct connecting mode, and may be also set to a connecting mode through an adapter.

Figure 20:
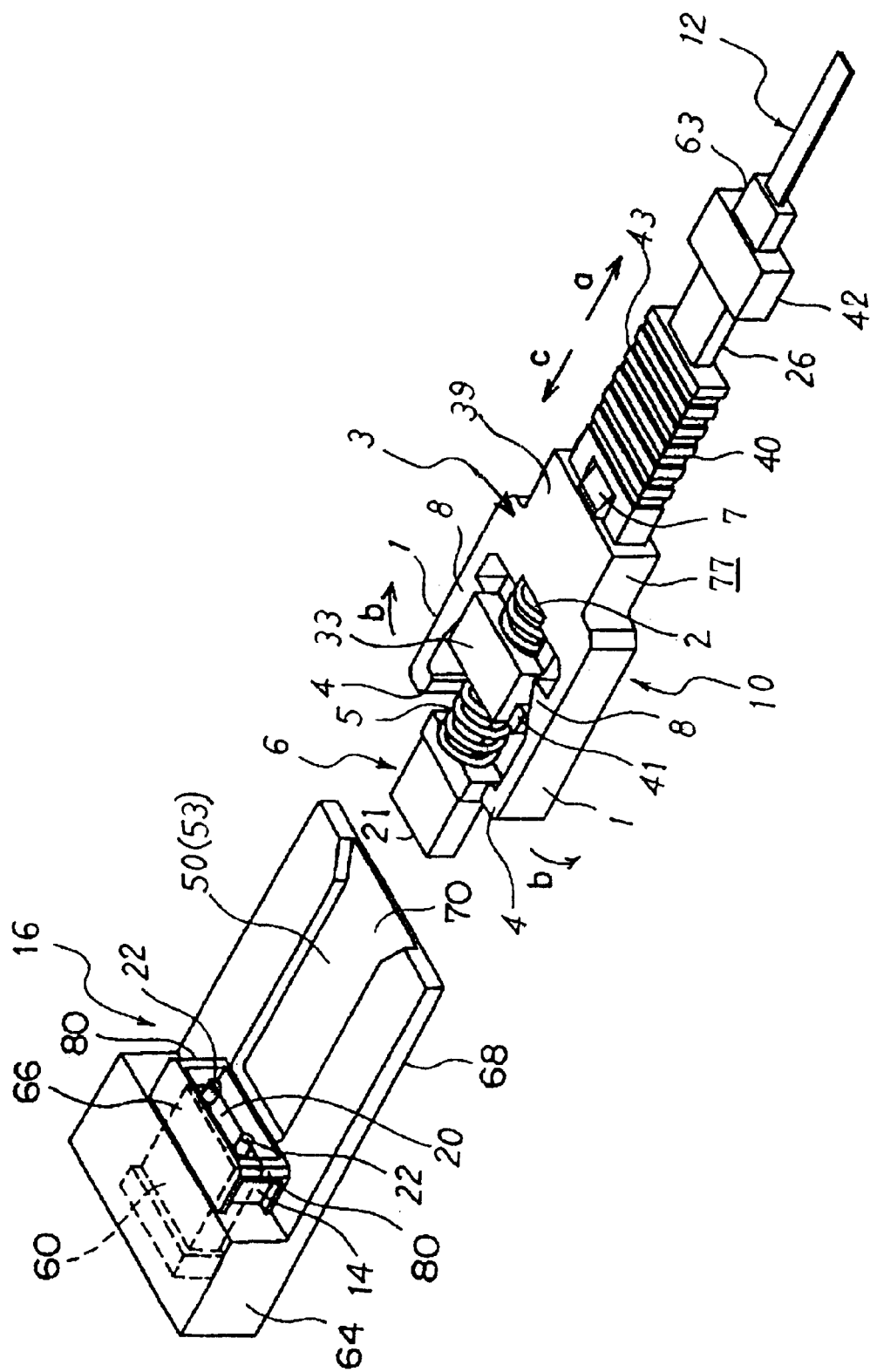
FIG. 20 is an explanatory perspective view showing one example of an optical connector connecting structure of the invention.
Figure 21:
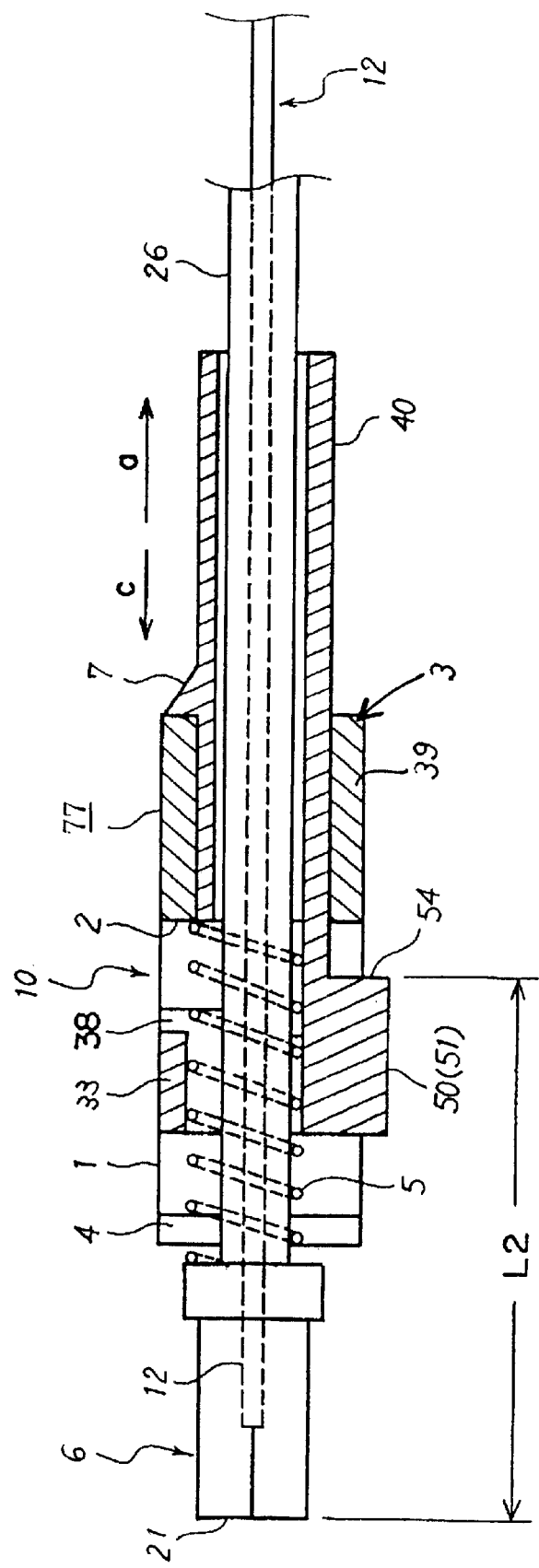
FIG. 21 is an explanatory view sectionally showing the structure of an optical connector shown in FIG. 20.

FIG. 20 shows one embodiment of a connecting structure of the optical connector 10 and the optical part 16 as a connecting object. As shown in FIG. 21, a guide convex portion 51 is projected below a bottom face of the base end wall 39 of the optical connector housing 3 on a bottom face (here a bottom face of the opening angle driving cam member 33) of the slider 40 on its tip side. As explained later, this guide convex portion 51 constitutes a guide mechanism 50 together with a guide concave portion 53 arranged on a side of the optical part 16 as a connecting object.

The optical part 16 as a connecting object shown in FIG. 20 differs from the optical part 16 shown in FIGS. 8 and 13 in the shape of a housing 64, and the other constructions of this optical part 16 in FIG. 20 are the same as the optical part 16 shown in FIGS. 8 and 13. In FIG. 20, a circumferential wall 66 is arranged in the housing 64 so as to surround a connecting face (connecting end face) 20 exposed to the exterior. An engagement receiving portion 14 engaged with the claw portion 4 of the optical connector 10 is arranged on each of two faces of this circumferential wall 66 opposed in its width direction. One face (bottom face) of the housing 64 is extended and the guide concave portion 53 is formed on this extending face 68. This guide concave portion 53 constitutes the guide mechanism 50 together with the guide convex portion 51 (FIG. 21) of the optical connector 10. When the optical connector 10 is connected to the optical part 16 and this connection is released, the guide concave portion 53 guides the guide convex portion 51 of the slider 40 fitted to this guide concave portion 53, and slides the slider 40 in the direction of an arrow a or c of FIG. 20 without an axial shift. An inlet 70 of the guide concave portion 53 is formed in a taper shape widened outward so as to easily fit the guide convex portion 51.

As shown in FIG. 20, two guide pins 22 are projected in parallel with each other on a connecting face 20 of an MT ferrule 60 arranged in a connecting object 2. An unillustrated guide hole for inserting each of the guide pins 22 thereinto is formed in the MT ferrule 6 on a side the optical connector 10.

The optical connector 10 having the above structure and the connecting object (here the optical part 16) are connected as follows.

Figure 22A:
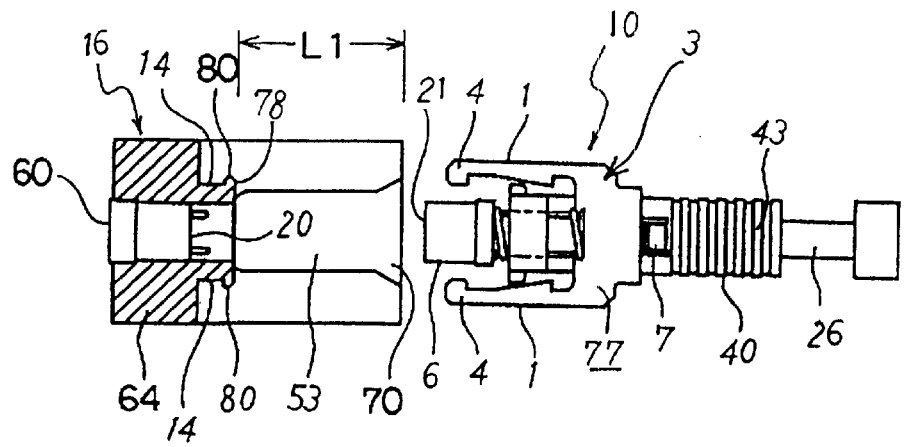
FIGS. 22A, 22B and 22C are plan views showing a connecting process of the optical connector and a connecting object in the optical connector connecting structure of FIG. 20.

As shown in FIG. 22A, the optical connector 10 is opposed to the optical part 16 mounted onto an unillustrated substrate. More particularly, a connecting end face 21 of the MT ferrule 6 in the optical connector 10 is opposed to the connecting face 20 of the MT ferrule 60 of the optical part 16 by gripping a gripping portion 43 of the slider 40 of the optical connector 10.

Figure 22B:
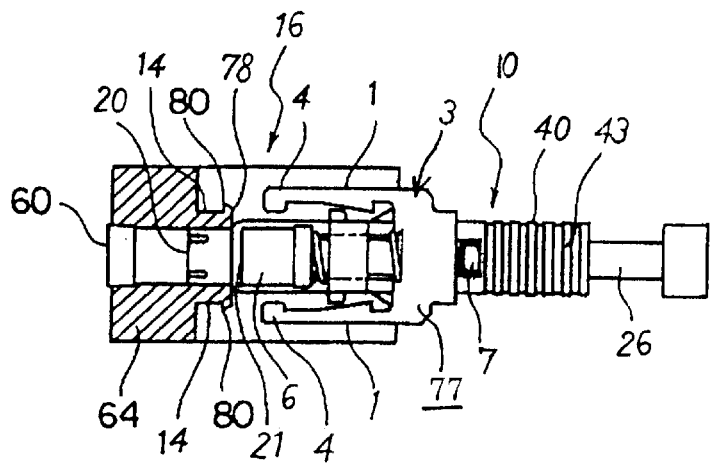

Next, as shown in FIG. 22B, the optical connector 10 is arranged in proximity to the optical part 16. Then, the guide convex portion 51 (see FIG. 21) of the slider 4 of the optical connector 10 is inserted into the guide concave portion 53 on a side of the optical part 16 from the inlet 70. Thereafter, the optical connector 10 further approaches the optical part 16 by moving the convex portion 51 along the guide concave portion 53. An entire length L1 of the guide concave portion 53 on the side of the optical part 16 is set to be longer than a distance L2 (see FIG. 21) from a rear end 54 of the guide convex portion 51 of the slider 40 to the connecting end face 21 of the ferrule 6. Therefore, the guide convex portion 51 is fitted and guided by the guide concave portion 53 before the connecting end face 21 of the ferrule 6 approaching the optical part 16 comes in contact with an end face 78 of the housing circumferential wall 66 of the optical part 16. Accordingly, when the optical connector 10 approaches the optical part 16, there is no case in which the optical connector 10 is axially shifted and the connecting end face 21 of the ferrule 6 hits against the circumferential wall 66, etc. and is damaged. The guide convex portion 51 is projected below the bottom face (the bottom face of the base end wall 39) of the optical connector housing 3. Accordingly, the direction of the optical connector 10 is correctly determined and a connection error of the optical connector 10 and the optical part 16 can be also prevented by fitting this guide convex portion 51 and the guide concave portion 53.

As mentioned above, when the optical connector 10 approaches the optical part 16 until a predetermined distance in accordance with the guide of the guide mechanism 50, the claw portion 4 at a tip of the arm portion 1 abuts on a convex portion 80 formed on this side of the engagement receiving portion 14. Further, when the slider 40 of the gripped optical connector 10 is pressed on the side of the optical part 16, the arm side member 77 is pressed on the side of the optical part 16 by the projection 7 of the slider 40. Therefore, the arm portion 1 is elastically deformed in the direction of an arrow b of FIG. 20, and the claw portion 4 gets over the convex portion 80 and is engaged with the engagement receiving portion 14. Simultaneously, the connecting faces 21, 20 of the ferrule 6 of the optical connector 10 and the MT ferrule 60 of the optical part 16 are butted, and optical fibers inserted into both the ferrules 6, 60 are optically connected to each other.

The connection of the optical connector 10 and the optical part 16 connected as mentioned above is released as follows.

Figure 22C:
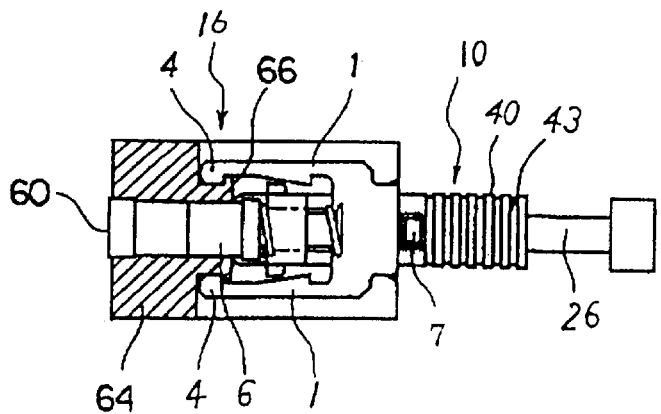
Figure 23A:
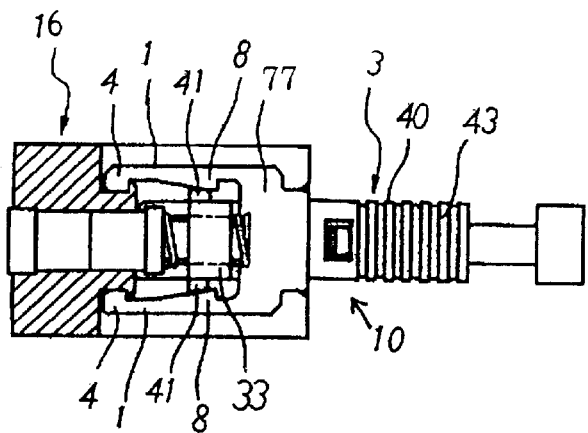
FIGS. 23A, 23B and 23C are plan views showing a connection releasing process of the optical connector and the connecting object in the optical connector connecting structure of FIG. 20.

In a state shown in FIG. 22C, the optical connector 10 connected to the optical part 16 is pulled in the direction of an arrow a in FIG. 20 by gripping the gripping portion 43 of the slider 40. When the slider 40 is pulled in the direction of the arrow a, the slider 40 is moved in the same direction as shown in FIG. 23A. The opening angle driving cam member 33 is retreated by this movement in the same direction, and the projecting portion 41 of the opening angle driving cam member 33 abuts on the taper-shaped face of the cam following face 9 of the arm portion 1.

Figure 23B:
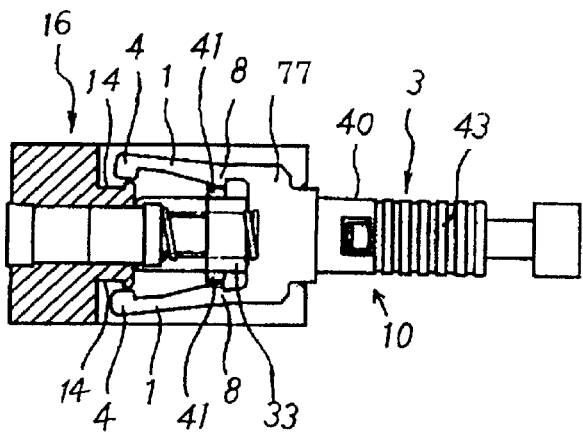
Figure 23C:
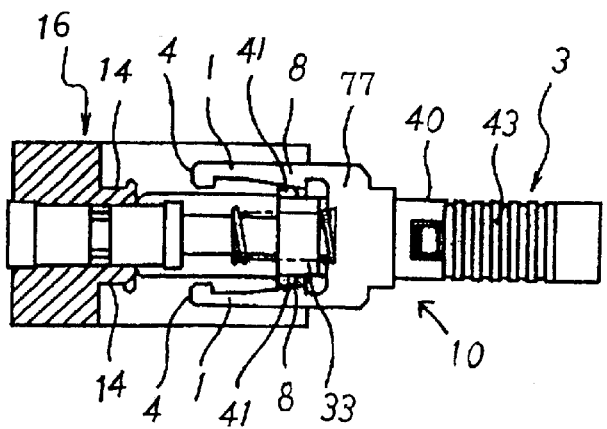

When the slider 40 is further retreated in the direction of the arrow a, the arm portion 1 is angularly opened by cam driving of the opening angle driving cam member 33, and the connection is released via operations shown in FIGS. 23B and 23C. However, this releasing operation is the same as the releasing operation explained in the first and second embodiments, and its overlapping explanation is omitted here.

In this embodiment, the optical connector 10 is guided by the guide mechanism 50 and is detachably attached. Therefore, when the optical connector 10 is connected to the optical part 16, there is no fear that the connecting end face 21 of the ferrule 6 of the optical connector 10 hits against a side of the housing 64 as a connecting object, etc. and is damaged.

Further, since the optical connector 10 is guided by the guide mechanism 50, the claw portion 4 of the optical connector 10 engaged with the engagement receiving portion 14 of the optical part 16 is smoothly disengaged from the engagement receiving portion 14 when the connection of the optical connector 10 and the optical part 16 is released. Accordingly, it is possible to prevent disadvantages in which the claw portion 4 is detached on one side and no connection of the optical connector 10 and the optical part 16 is easily released, and the optical connector 10 is damaged by applying excessive force to the optical connector 10.

The following construction can be applied as a substitution example of this optical connector connecting structure. For example, the guide mechanism 50 is constructed such that the guide convex portion 51 is arranged in the optical connector 10 (slider 40) in the above embodiment, but the guide concave portion 53 is arranged in the optical part 16. Conversely, the connecting structure can be constructed such that a guide concave portion is arranged in the optical connector 10, and a guide convex portion is arranged in the optical part 16. With respect to the optical connector 10, it is possible to apply the substitution construction of the optical connector of the above second embodiment.

Figure 24:
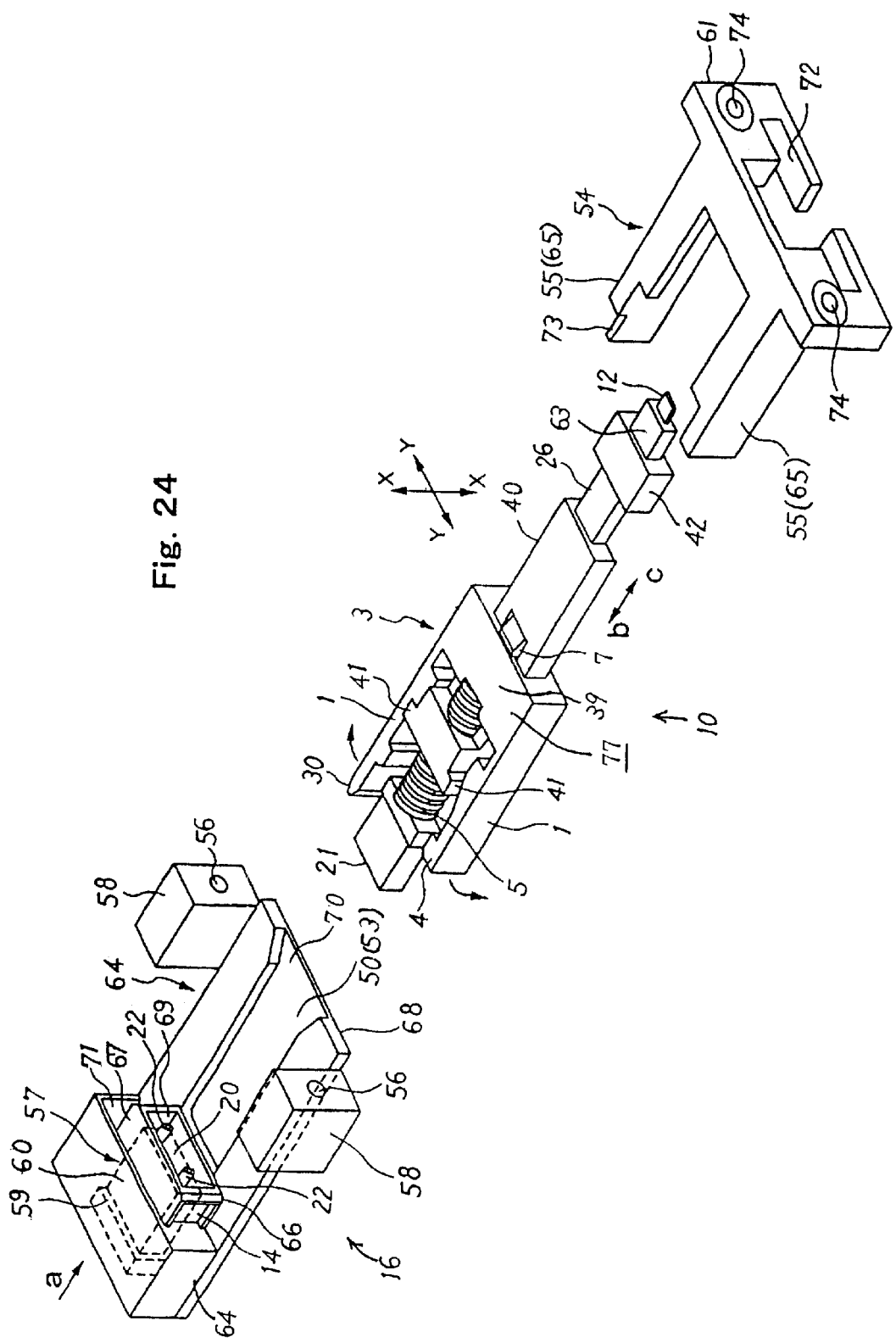
FIG. 24 is an explanatory perspective view showing another example of the optical connector connecting structure of the invention.

FIG. 24 shows another embodiment of the connecting structure of the optical connector 10 and the optical part 16. This embodiment shown in FIG. 24 differs from the embodiment shown in FIG. 20 in that the connecting structure of the embodiment shown in FIG. 24 has a means for fixing a connecting state of the optical connector 10 and the optical part 16. The other constructions are the same as the embodiment of FIG. 20.

The connecting structure of the embodiment shown in FIG. 24 has an external housing 54. This external housing 54 is used to more reliably and firmly join the optical connector 10 and the optical part 16 in the connecting state.

This external housing 54 has a covering portion 55 covering the outside of the optical connector housing 3 to cover the optical connector housing 3; an insert portion 73 inserted into an insert receiving portion 71 of the optical part 16 in a state in which the optical connector housing 3 is covered with the covering portion 55; and a positioning portion 72 able to regulate that the optical connector 10 is moved to a biaxial direction crossing advancing and retreating directions of the optical connector 10.

The covering portion 55 is constructed by a pair of arms 65 projected from both the outsides of a base portion 61 in its width direction. Each of the arms 65 approximately has an L-shape in section in which side and upper faces of the base end wall 39 of the optical connector housing 3 in its width direction are covered with the arm 65. One arm 65 is longer than the other arm, and a tip of this one arm 65 is set to the insert portion 73 inserted into the insert receiving portion 71 of the optical part 16. The positioning portion 72 has a sectional shape able to surround a rear end portion of the base end wall 39 of the optical connector housing 3 and its circumference. A rear end side of the external housing 54 abuts on an outer circumferential face of the rear end portion of the base end wall 39 on a side of the optical connector housing 3. A screw insertion hole 74 is formed on each of both outside front faces of the positioning portion 72 in its width direction.

In contrast to this, a accommodating portion 67 able to accommodate the MT ferrule 60 on one side of an extending face (bottom face) 68 of a plate shape in its longitudinal direction is formed in the housing 64 on a side of the optical part 16. A screw stopping block 58 having a screw hole 56 is arranged on each of both outsides of the extending face 68 on its other end side. The accommodating portion 67 has a sectional shape approximately formed in a rectangular sleeve shape, and an optical connector 57 (MT ferrule 60) can be inserted from the direction of an arrow a of FIG. 24. An unillustrated regulating portion is formed within the accommodating portion 67, and abuts on a tip face 59 of a flange portion of the optical connector 57 (MT ferrule 60) inserted into the direction of the arrow a of FIG. 24 and regulates the optical connector 57 such that no optical connector 57 is further inserted in the direction of the arrow a. Further, an opening portion 69 is formed in the accommodating portion 67. When the optical connector 57 is accommodated in a predetermined position, a connecting face 20 (connecting end face) 20 of the optical connector 57 is adapted to be exposed to the exterior through the opening portion 69. The insert receiving portion 71 is formed on one of the outsides of the opening portion 69 in its width direction.

A circumferential wall 66 is projected around the opening portion 69 so that the connecting face 20 of the optical connector 57 exposed to the exterior in the opening portion 69 is surrounded by the circumferential wall 66. An engagement receiving portion 14 able to be engaged with the claw portion 4 of the optical connector housing 3 is formed on each of both side wall external surfaces of the circumferential wall 66.

Similar to the above case of FIG. 20, the optical connector 10 and the optical part 16 are connected and this connection is released by utilizing the guide mechanism. The outside (the outside of the arm side member 77) of the optical connector housing 3 is covered with the external housing 54 as follows in a state in which the optical connector 10 is connected to the optical part 16.

Figure 25:
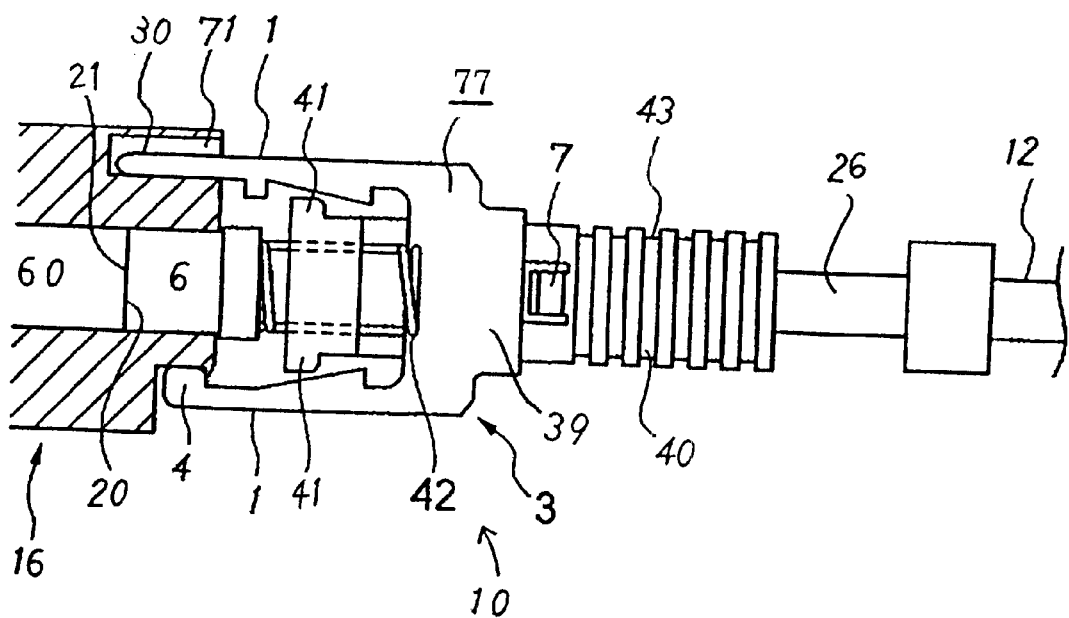
FIG. 25 is a view showing a state in which an arm extending portion 30 of an optical connector housing 3 is engaged with an insertion receiving portion 71 of a housing 64 on the side of an optical part 16 in the optical connector connecting structure of FIG. 24.

First, both the outsides of a rear end portion of the arm side member 77 of the optical connector housing 3 are covered with the respective arms 65 of the external housing 54. Next, the external housing 54 is slid onto a tip side of the optical connector housing 3, and both side faces and an upper face of the arm side member 77 of the optical connector housing 3 in its width direction are covered with the arm 65 of the external housing 54. Next, the external housing 54 is further slid onto the tip side of the optical connector housing 3. Then, the insert portion 73 of one arm 65 of the external housing 54 is inserted into the insert receiving portion 71 on a side of the optical part 16. At this time, a rear end portion of the arm side member 77 is inserted into the inside of the positioning portion 72 of the external housing 54. The insert portion 73 is inserted into the outside of the arm extending portion 30 (see FIG. 25) of the optical connector housing 3 already inserted into the engagement receiving portion 71.

Next, a screw inserted from the screw insertion hole 74 of the external housing 54 is screwed into the screw hole 56 of the screw stopping block 58 so that the side of the optical part 16 and the side of the optical connector 10 are fixed to each other.

No arm 65 on an insertion side of the insert portion 73 into the engagement receiving portion 71 of the housing 64 can be moved in a biaxial direction (X and Y directions of FIG. 24) crossing a joining direction of the ferrule 6. Therefore, no entire external housing 54 can be moved in the same direction. Thus, no optical connector housing 3 covered with the external housing 54 can be also moved in the same direction, and no ferrule 6 accommodated within the optical connector housing 3 can be also moved in the same direction. Further, since the rear end portion of the arm side member 77 is inserted into the inside of the positioning portion 72 of the external housing 54, the movement to the above biaxial direction is also regulated. Thus, the optical connector housing 3 is perfectly locked and the internal ferrule 6 is also perfectly locked.

The external housing 54 is removed from the side of the optical part 16 to release the connection of the optical part 16 and the optical connector 10, and this releasing operation is performed as follows. First, the screw fixing the external housing 54 and the housing 64 is detached. Next, the external housing 54 is slid onto the rear end side of the optical connector housing 3, and is separated from the optical connector housing 3.

After the external housing 54 is removed, the slider 40 is slid and moved backward and the connection of the optical part 16 and the optical connector 10 is released. This releasing operation is similar to that in the above-mentioned first and second embodiments. Therefore, an overlapping explanation of this releasing operation is omitted here.

In this embodiment, the connecting state of the optical part 16 and the optical connector 10 is fixed by the external housing 54. As a result, the optical connector 10 and the optical part 16 are further reliably and firmly connected to each other. Therefore, even when some external force is applied to the optical connector housing 3, there is no case in which connection loss of the optical connector 10 is increased and the joining of the optical connector 10 and the optical part 16 as a joining partner is released.

Further, the external housing 54 has the positioning portion 72 abutting on the outer circumferential face of the rear end portion of the optical connector housing 3 (the arm side member 77) and regulating the movement in the biaxial direction crossing the advancing and retreating directions of the optical connector 10. The above effects become further reliable by the position regulation of this positioning portion 72.

Further, the housing 64 on the side of the optical part 16 and the external housing 54 are fastened and fixed by the screw. Therefore, the above position regulating state is stably maintained, and a preferable connecting state of the optical part 16 and the optical connector 10 is stably held.

What is claimed is:

1. An optical connector housing for accommodating a ferrule of an optical connector, comprising:

arm portions respectively extending forward from both end sides of a base end wall;

an opening angle driving cam member arranged between the arm portions; and a slider for advancing and retreating said opening angle driving cam member in an extending direction of said arm portion;

wherein an engaging portion engaged with a connecting partner side is formed on each of tip sides of both said arm portions;

a tip portion of the arm portion on at least one side has an arm extending portion extended and formed forward from said engaging portion;

a cam following face moved by the retreating movement of said opening angle driving cam member and angularly opening the arm portion is formed in each of inner walls of both said arm portions; and the engagement of the engaging portion on the tip side of said arm portion with the connecting partner is released by the angular opening of said arm portion.

2. An optical connector having the optical connector housing according to claim 1, and the ferrule is accommodated to a forward side from the opening angle driving cam member between the arm portions of the optical connector housing, and a biasing member for biasing said ferrule on the connecting partner side is arranged in the optical connector housing.

3. An optical connector according to claim 2, wherein an optical fiber core pulled out of a rear end side of the ferrule is guided to the exterior of the optical connector housing through a slider;

said slider is arranged in the extending direction of the arm portion of said optical connector housing so as to be freely advanced and retreated;

the opening angle driving cam member is arranged on a tip side of said slider; and a projecting portion abutting on the cam following face of the arm portion of the optical connector housing and operated to angularly open the arm portion is formed in this opening angle driving cam member.

4. An optical connector connecting structure in which an engagement receiving portion engaged with the engaging portion of said optical connector, and a fitting concave portion fitting the arm extending portion of said optical connector thereinto are arranged on the connecting partner side of the optical connector according to claim 2, and the extending portion on a tip side of the arm portion of said optical connector is fitted to the fitting concave portion, and said optical connector and the connecting partner are connected to each other by engaging the engaging portion of said optical connector with the engagement receiving portion on said connecting partner side.

5. An optical connector connecting structure in which an engagement receiving portion engaged with the engaging portion of said optical connector, and a fitting concave portion fitting the arm extending portion of said optical connector thereinto are arranged on the connecting partner side of the optical connector according to claim 3, and the extending portion on a tip side of the arm portion of said optical connector is fitted to the fitting concave portion, and said optical connector and the connecting partner are connected to each other by engaging the engaging portion of said optical connector with the engagement receiving portion on said connecting partner side.

6. An optical connector housing for accommodating a ferrule of an optical connector, comprising:

arm portions respectively extending forward from both end sides of a base end wall;

an opening angle driving cam member arranged between the arm portions; and a slider for advancing and retreating said opening angle driving cam member in an extending direction of said arm portion;

wherein an engaging portion engaged with a connecting partner side is formed on each of tip sides of both said arm portions;

a cam following face moved by the retreating movement of said opening angle driving cam member and angularly opening the arm portion is formed in each of inner walls of both said arm portions;

said cam following face has a taper-shaped face rising on a rear side, and a stationary face having no inclination and flatly extending backward from a terminal end of this taper-shaped face; and the opening angle of the arm portion is held by abutting the opening angle driving cam member on the stationary face of said arm portion.

7. An optical connector housing according to claim 6, wherein a projecting portion is formed on a face of the opening angle driving cam member opposed to the arm portion, and a face of this projecting portion opposed to the arm portion is set to a flat face substantially parallel to the stationary face of the cam following face, and the opening angle of the arm portion is held by abutting the stationary face of the cam following face and said flat face of the opening angle driving cam member.

8. An optical connector housing according to claim 6, wherein said opening angle driving cam member and the stationary face of the cam following face of said arm portion abut on each other and the opening angle of the arm portion is held when a rear end portion of the opening angle driving cam member abuts on a face of the optical connector housing on its base end side by moving the slider.

9. An optical connector housing according to claim 7, wherein said opening angle driving cam member and the stationary face of the cam following face of said arm portion abut on each other and the opening angle of the arm portion is held when a rear end portion of the opening angle driving cam member abuts on a face of the optical connector housing on its base end side by moving the slider.

10. An optical connector in which the optical connector housing according to claim 6 is arranged, and the ferrule is accommodated on a forward side from the opening angle driving cam member between the arm portions of the optical connector housing, and a biasing member for biasing said ferrule on the connecting partner side is arranged in the optical connector housing.

11. An optical connector in which the optical connector housing according to claim 7 is arranged, and the ferrule is accommodated on a forward side from the opening angle driving cam member between the arm portions of the optical connector housing, and a biasing member for biasing said ferrule on the connecting partner side is arranged in the optical connector housing.

12. An optical connector connecting structure in which an engagement receiving portion engaged with the engaging portion of said optical connector is arranged on the connecting partner side of the optical connector according to claim 10, and said optical connector and the connecting partner are connected to each other by engaging the engaging portion of said optical connector with the engagement receiving portion on said connecting partner side.

13. An optical connector comprising:

an optical connector housing; and a ferrule accommodated to said optical connector housing and connected and fixed to the tip side of an optical fiber;

said optical connector housing having:

arm portions respectively extending forward from both end sides of a base end wall;

an opening angle driving cam member arranged between the arm portions; and a slider for advancing and retreating said opening angle driving cam member in an extending direction of said arm portion;

wherein said opening angle driving cam member is arranged on a rear side of said ferrule;

an engaging portion engaged with a connecting partner side is formed on each of tip sides of both said arm portions;

a cam following face moved by the retreating movement of said opening angle driving cam member and angularly opening the arm portion is formed in each of inner walls of both said arm portions;

said optical fiber is an optical fiber of an optical fiber cord;

the outer circumference of an optical fiber core exposed by removing an outer cover of said optical fiber cord is covered with a sleeve-shaped member; and an end portion of the outer cover of the optical fiber cord member is fixed to an outer circumferential portion of said sleeve-shaped member, and said sleeve-shaped member is freely moved relatively with respect to the optical fiber core along a longitudinal direction of the optical fiber core.

14. An optical connector according to claim 13, wherein the optical fiber cord is constructed such that a tensile strength fiber is interposed between the optical fiber core and the outer cover, and the tensile strength fiber is fixed to the outer circumferential portion of the sleeve-shaped member.

15. An optical connector according to claim 13, wherein a stopper means for regulating a moving allowance amount of the sleeve-shaped member in its retreating direction with respect to the ferrule is arranged.

16. An optical connector according to claim 14, wherein a stopper means for regulating a moving allowance amount of the sleeve-shaped member in its retreating direction with respect to the ferrule is arranged.

17. An optical connector according to claim 13, wherein a boot for covering one portion of an exposed portion of the optical fiber core pulled out of the ferrule is fixed to this ferrule, the tensile strength fiber of the optical fiber cord is fixed to the outer circumferential portion of the sleeve-shaped member, the boot is fitted to a tip side of the sleeve-shaped member, and this sleeve-shaped member is freely moved relatively with respect to the boot.

18. An optical connector according to claim 14, wherein a boot for covering one portion of an exposed portion of the optical fiber core pulled out of the ferrule is fixed to this ferrule, the tensile strength fiber of the optical fiber cord is fixed to the outer circumferential portion of the sleeve-shaped member, the boot is fitted to a tip side of the sleeve-shaped member, and this sleeve-shaped member is freely moved relatively with respect to the boot.

19. An optical connector comprising:

an optical connector housing; and a ferrule accommodated to said optical connector housing and connected and fixed to the tip side of an optical fiber;

said optical connector housing having:

arm portions respectively extending forward from both end sides of a base end wall;

an opening angle driving cam member arranged between the arm portions; and a slider for advancing and retreating said opening angle driving cam member in an extending direction of said arm portion;

wherein said opening angle driving cam member is arranged on a rear side of said ferrule;

an engaging portion engaged with a connecting partner side is formed on each of tip sides of both said arm portions;

a cam following face moved by the retreating movement of said opening angle driving cam member and angularly opening the arm portion is formed in each of inner walls of both said arm portions;

said optical fiber is an optical fiber of an optical fiber cord;

an optical fiber core of the optical fiber cord exposed by removing an outer cover is pulled out of a rear end of said ferrule;

an outer circumference of the optical fiber core exposed by removing said outer cover is covered with a sleeve-shaped member;

a tensile strength fiber of the optical fiber cord exposed together with said optical fiber core by removing the outer cover is arranged in an outer circumferential portion of said sleeve-shaped member;

a member for fixation is fitted to the outer circumferential portion of said sleeve-shaped member arranging this tensile strength fiber therein by putting said tensile strength fiber therebetween;

irregularities are formed in at least one of an inner wall face of this member for fixation and an outer circumferential face portion of the sleeve-shaped member opposed to this inner wall face; and the sleeve-shaped member and the member for fixation nip and fix said tensile strength fiber by utilizing a convex portion of said irregularities.

20. An optical connector according to claim 19, wherein the member for fixation has a construction having a spring property by forming a slit in the member for fixation along a longitudinal direction of the optical fiber cord, and the tensile strength fiber is pressed and fixed to the sleeve-shaped member by applying pressing force of the spring property to the tensile strength fiber from the member for fixation.

21. An optical connector according to claim 19, wherein positioning means for determining a fitting position of both the sleeve-shaped member and the member for fixation is arranged in the sleeve-shaped member and the member for fixation.

22. An optical connector connecting structure for connecting an optical connector to a connecting object and releasing this connection;

said optical connector comprising:
a ferrule for accommodating and fixing the tip side of an optical fiber; and
an optical connector housing for accommodating this ferrule;
wherein said optical connector housing has a slider freely advanced and retreated;
said optical connector housing has arm portions respectively extending forward from both end sides of a base end wall, and an engaging portion engaged with said connecting object is formed on each of tip sides of both the arm portions;
a tip side of said slider is located between said arm portions, and an opening angle driving cam member is arranged on this tip side of the slider;
a cam following face moved by the retreating movement of said opening angle driving cam member and angularly opening the arm portion is formed in each of inner walls of both the arm portions of said optical connector housing;
an engagement receiving portion engaged with said engaging portion of each of both the arm portions of said optical connector housing is arranged in said connecting object;
a guide mechanism for guiding attaching and detaching movements of the optical connector with respect to the connecting object is arranged in said slider and a connecting object side;
when the slider is slid to the connecting object side in accordance with said guide mechanism, the optical connector housing is pressed against the slider and said engaging portion is automatically engaged with said engagement receiving portion; and
when the slider is slid in an opposite direction in accordance with the guide mechanism, said cam following face is moved by the movement of said opening angle driving cam member so that said arm portion is angularly opened and said engaging portion is disengaged from said engagement receiving portion.

23. An optical connector connecting structure according to claim 22, wherein the guide mechanism is constructed by a guide convex portion arranged on one side of the slider and the connecting object side, and a guide concave portion arranged on the other side, and said guide convex portion is fitted to said guide concave portion and is slid along the guide concave portion.

24. An optical connector connecting structure according to claim 22, wherein an entire length (L1) of the guide convex portion or the guide concave portion as the connecting object is longer than a distance (L2) from a rear end of the guide concave portion or the guide convex portion of the slider to a connecting face of the ferrule.

25. An optical connector connecting structure according to claim 22, wherein the optical connector has a biasing member for biasing the ferrule on the connecting object side when the optical connector is connected to the connecting object.

26. An optical connector connecting structure for connecting an optical connector to a connecting object and releasing this connection;

said optical connector comprising:
a ferrule for accommodating and fixing the tip side of an optical fiber;
an optical connector housing for accommodating this ferrule; and
an external housing for covering the outside of said optical connector housing;
wherein said optical connector housing has a slider freely advanced and retreated;
said optical connector housing has arm portions respectively extending forward from both end sides of a base end wall, and an engaging portion engaged with said connecting object is formed on each of tip sides of both the arm portions;
a tip side of said slider is located between said arm portions, and an opening angle driving cam member is arranged on this tip side of the slider;
a cam following face moved by the retreating movement of said opening angle driving cam member and angularly opening the arm portion is formed in each of inner walls of both the arm portions of said optical connector housing;
an insert portion projected forward is formed on a tip side of said external housing; and
an insert receiving portion inserting said insert portion of said external housing thereinto is arranged on said connecting object side.

27. An optical connector connecting structure according to claim 26, wherein the external housing has a positioning portion abutting on the outer circumferential face of a rear end portion of the optical connector housing, and this positioning portion regulates the movement in a biaxial direction crossing advancing and retreating directions of the optical connector housing.

28. An optical connector connecting structure according to claim 26, wherein a screw fixing portion for connecting both an external housing side and the connecting object side by a screw is arranged on the external housing side and the connecting object side.

* * * * *